United States Patent
Blush et al.

(10) Patent No.: US 12,110,251 B2
(45) Date of Patent: Oct. 8, 2024

(54) HIGH SPRING FORCE SHUTTER FOR DYNAMIC SHADE, AND/OR ASSOCIATED METHODS

(71) Applicant: GUARDIAN GLASS, LLC, Auburn Hills, MI (US)

(72) Inventors: Jason Blush, Milford, MI (US); Lindsay Horn, Auburn Hills, MI (US); Rudolph H. Petrmichl, Ann Arbor, MI (US); Joshua Finch, Auburn Hills, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 826 days.

(21) Appl. No.: 17/232,406

(22) Filed: Apr. 16, 2021

(65) Prior Publication Data

US 2022/0333434 A1 Oct. 20, 2022

(51) Int. Cl.
*G02B 26/02* (2006.01)
*B32B 17/10* (2006.01)
(Continued)

(52) U.S. Cl.
CPC .... *C03C 17/3649* (2013.01); *B32B 17/10045* (2013.01); *B32B 17/10495* (2013.01); *C03C 17/06* (2013.01); *C03C 17/34* (2013.01); *C03C 17/3639* (2013.01); *E06B 9/264* (2013.01); *B32B 7/12* (2013.01); *B32B 17/10* (2013.01);
(Continued)

(58) Field of Classification Search
CPC ..... C03C 17/3649; C03C 17/06; C03C 17/34; C03C 17/3639; C03C 2217/94; B32B 17/10045; B32B 17/10495; B32B 7/12; B32B 17/10; B32B 27/26; B32B 2419/00; E06B 9/264; E06B 2009/2643; E06B 9/40; E06B 2009/2447; E06B 2009/2464
See application file for complete search history.

(56) References Cited

U.S. PATENT DOCUMENTS

| 4,266,339 A | 5/1981 | Kalt |
| 6,887,575 B2 | 5/2005 | Neuman |

(Continued)

FOREIGN PATENT DOCUMENTS

WO 2020008440 A1 1/2020

OTHER PUBLICATIONS

International Search Report and Written Opinion received for PCT Application No. PCT/IB2022/052329, mailed on Aug. 19, 2022, 25 Pages.
(Continued)

*Primary Examiner* — Euncha P Cherry

(57) ABSTRACT

Certain example embodiments relate to electric, potentially-driven shades usable with insulating glass (IG) units, IG units including such shades, and/or associated methods. In such a unit, a dynamic shade is located between the substrates defining the IG unit, and is movable between retracted and extended positions. The dynamic shade includes on-glass layers including a transparent conductor and an insulator or dielectric film, as well as a shutter. The shutter includes a resilient polymer-based layer and layers on opposing surfaces thereof. A first voltage is applied to the transparent conductors to cause the shutter to extend to a closed position.

22 Claims, 11 Drawing Sheets

(51) Int. Cl.
  *C03C 17/06* (2006.01)
  *C03C 17/34* (2006.01)
  *C03C 17/36* (2006.01)
  *E06B 9/264* (2006.01)
  *B32B 7/12* (2006.01)
  *B32B 27/26* (2006.01)

(52) U.S. Cl.
  CPC ............ *B32B 27/26* (2013.01); *B32B 2419/00* (2013.01); *C03C 2217/94* (2013.01); *E06B 2009/2643* (2013.01)

(56) References Cited

U.S. PATENT DOCUMENTS

| | | |
|---|---|---|
| 7,056,588 B2 | 6/2006 | Neuman |
| 7,189,458 B2 | 3/2007 | Ferreira |
| 7,198,851 B2 | 4/2007 | Lemmer et al. |
| 7,645,977 B2 | 1/2010 | Schlam |
| 7,705,826 B2 | 4/2010 | Kalt |
| 7,771,830 B2 | 8/2010 | Neuman |
| 7,998,320 B2 | 8/2011 | Laird |
| 8,035,075 B2 | 10/2011 | Schlam |
| 8,134,112 B2 | 3/2012 | Schlam |
| 8,557,391 B2 | 10/2013 | Frank et al. |
| 8,668,990 B2 | 3/2014 | Broadway |
| 8,736,938 B1 * | 5/2014 | Schlam ............... G02B 26/02 359/230 |
| 8,982,441 B2 | 3/2015 | Schlam |
| 9,556,066 B2 | 1/2017 | Frank |
| 9,670,092 B2 | 6/2017 | Lemmer et al. |
| 9,695,085 B2 | 7/2017 | Lemmer et al. |
| 9,796,619 B2 | 10/2017 | Broadway |
| 9,802,860 B2 | 10/2017 | Frank |
| 10,876,349 B2 | 12/2020 | Blush et al. |
| 2014/0272314 A1 | 9/2014 | Veerasamy |

OTHER PUBLICATIONS

Wyser, Y., et al., "Predicting and determining the bending stiffness of thin films and laminates," Packaging Technology and Science, vol. 14, Issue 3, Jun. 2001, pp. 97-108.

* cited by examiner

| E1,E2,t2 | 300,6,25 | | 50 | | 200,5,15 | | 40 | | 50,5,20 | | 10 | | 10,1,10 | | 10 | | 12,6,25 | | 2 | |
|---|---|---|---|---|---|---|---|---|---|---|---|---|---|---|---|---|---|---|---|---|
| E1/E2 | t1 | t1E1/t2E2 | t1 | t1E1/t2E2 | t1 | t1E1/t2E2 | t1 | t1E1/t2E2 | t1 | t1E1/t2E2 | t1 | t1E1/t2E2 | t1 | t1E1/t2E2 | t1 | t1E1/t2E2 | t1 | t1E1/t2E2 | t1 | t1E1/t2E2 |
| SPRING FORCE GAIN | | | | | | | | | | | | | | | | | | | | |
| 25% | 0.11 | | 0.22 | | 0.09 | | 0.25 | | 0.56 | | 0.28 | | 0.27 | | 0.27 | | 6.25 | | | 0.50 |
| 50% | 0.21 | | 0.42 | | 0.17 | | 0.47 | | 0.96 | | 0.48 | | 0.49 | | 0.49 | | - | | - | |
| 100% | 0.39 | | 0.79 | | 0.32 | | 0.84 | | 1.78 | | 0.89 | | 0.92 | | 0.92 | | - | | - | |

Fig. 18

HIGH SPRING FORCE SHUTTER FOR DYNAMIC SHADE, AND/OR ASSOCIATED METHODS

TECHNICAL FIELD

Certain example embodiments of this invention relate to shades that may be used with insulating glass units (IG units or IGUs), IG units including such shades, and/or methods of making the same. More particularly, certain example embodiments of this invention relate to electric, potentially-driven shades that may be used with IG units, IG units including such shades, and/or methods of making the same.

BACKGROUND AND SUMMARY

The building sector is known for its high energy consumption, which has been shown to represent 30-40% of the world's primary energy expenditure. Operational costs, such as heating, cooling, ventilation, and lighting account for the better part of this consumption, especially in older structures built under less stringent energy efficiency construction standards.

Windows, for example, provide natural light, fresh air, access, and connection to the outside world. However, they oftentimes also represent a significant source of wasted energy. With the growing trend in increasing the use of architectural windows, balancing the conflicting interests of energy efficiency and human comfort is becoming more and more important. Furthermore, concerns with global warming and carbon footprints are adding to the impetus for novel energy efficient glazing systems.

In this regard, because windows are usually the "weak link" in a building's isolation, and considering modern architectural designs that often include whole glass facades, it becomes apparent that having better insulating windows would be advantageous in terms of controlling and reducing energy waste. There are, therefore, significant advantages both environmentally and economically in developing highly insulating windows.

Insulating glass units (IG units or IGUs) have been developed and provide improved insulation to buildings and other structures, and FIG. 1 is a cross-sectional, schematic view of an example IG unit. In the FIG. 1 example IG unit, first and second substrates 102 and 104 are substantially parallel and spaced apart from one another. A spacer system 106 is provided at the periphery of the first and second substrates 102 and 104, helping to maintain them in substantially parallel spaced apart relation to one another and helping to define a gap or space 108 therebetween. The gap 108 may be at least partially filled with an inert gas (such as, for example, Ar, Kr, Xe, and/or the like) in some instances, e.g., to improve the insulating properties of the overall IG unit. Optional outer seals may be provided in addition to the spacer system 106 in some instances.

Windows are unique elements in most buildings in that they have the ability to "supply" energy to the building in the form of winter solar gain and daylight year around. Current window technology, however, often leads to excessive heating costs in winter, excessive cooling costs in summer, and often fails to capture the benefits of daylight, that would allow lights to be dimmed or turned off in much of the nation's commercial stock.

Thin film technology is one promising way of improving window performance. Thin films can, for example, be applied directly onto glass during production, on a polymer web that can be retrofitted to an already pre-existing window at correspondingly lower cost, etc. And advances have been made over the last two decades, primarily in reducing the U-value of windows through the use of static or "passive" low-emissivity (low-E) coatings, and by reducing the solar heat gain coefficient (SHGC) via the use of spectrally selective low-E coatings. Low-E coatings may, for example, be used in connection with IG units such as, for example, those shown in and described in connection with FIG. 1. However, further enhancements are still possible.

For instance, it will be appreciated that it would be desirable to provide a more dynamic IG unit option that takes into account the desire to provide improved insulation to buildings and the like, takes advantage of the ability of the sun to "supply" energy to its interior, and that also provides privacy in a more "on demand" manner. It will be appreciated that it would be desirable for such products to have a pleasing aesthetic appearance, as well.

Certain example embodiments address these and/or other concerns. For instance, certain example embodiments of this invention relate to electric, potentially-driven shades that may be used with IG units, IG units including such shades, and/or methods of making the same.

In certain example embodiments, an insulating glass (IG) unit is provided. First and second substrates each have interior and exterior major surfaces, the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates. The shade includes: a first conductive layer provided, directly or indirectly, on the interior major surface of the first substrate; a first dielectric layer provided, directly or indirectly, on the first conductive layer on a side thereof opposite the first substrate; and a shutter including a flexible substrate having a first modulus of elasticity. The flexible substrate includes first and second sides and having a first thickness. The first side of the flexible substrate supports a first layer stack comprising one or more layers and includes at least a second conductive layer. The first layer stack has a second thickness and a second modulus of elasticity. The second side of the flexible substrate supports a second layer stack comprising one or more layers. The second layer stack collectively has a third thickness and a third modulus of elasticity. The second modulus and the third modulus each are greater than the first modulus. The shutter is extendible from a shutter open position to a shutter closed position and is retractable from the shutter closed position to the shutter open position. A control circuit is configured to provide a voltage to create electrostatic forces that drive the flexible substrate to the shutter closed position. The ratio of the lower of the second and third modulus and the first modulus is at least 10, and (a) the lower of a product of the second modulus and the second thickness and a product of the third modulus and the third thickness, divided by (b) a product of the first modulus and the first thickness, is at least 0.2.

In certain example embodiments, a substrate is provided. The substrate includes a dynamically controllable shade provided on the substrate. The shade includes a first conductive layer provided, directly or indirectly, on the substrate; a first dielectric layer provided, directly or indirectly, on the first conductive layer on a side thereof opposite the substrate; and a shutter including a flexible substrate having a first modulus of elasticity. The flexible substrate includes first and second sides and having a first thickness, the first side of the flexible substrate supporting a first layer stack comprising one or more layers and including at least a second conductive layer, the first layer stack having a second thickness and a second modulus of elasticity, the second side of the flexible substrate supporting a second layer stack comprising one or more layers, the second layer stack collectively having a third thickness and a third modulus of elasticity, the second modulus and the third modulus each being greater than the first modulus. The shutter is extendible from a shutter open position to a shutter closed position and is retractable from the shutter closed position to the shutter open position. The ratio of the lower of the second and third modulus and the first modulus is at least 10, and (a) the lower of a product of the second modulus and the second thickness and a product of the third modulus and the third thickness, divided by (b) a product of the first modulus and the first thickness, is at least 0.2. The substrate may include features of any of the eight previous paragraphs, for example.

In certain example embodiments, a method of making an insulating glass (IG) unit is provided. The method comprises having first and second substrates, each having interior and exterior major surfaces, the interior major surface of the first substrate facing the interior major surface of the second substrate. A dynamically controllable shade is provided on the first and/or second substrate. The shade includes: a first conductive layer provided, directly or indirectly, on the interior major surface of the first substrate; a first dielectric layer provided, directly or indirectly, on the first conductive layer on a side thereof opposite the first substrate; and a shutter including a flexible substrate having a first modulus of elasticity. The flexible substrate includes first and second sides and having a first thickness, the first side of the flexible substrate supporting a first layer stack comprising one or more layers and including at least a second conductive layer, the first layer stack having a second thickness and a second modulus of elasticity, the second side of the flexible substrate supporting a second layer stack comprising one or more layers, the second layer stack collectively having a third thickness and a third modulus of elasticity, the second modulus and the third modulus each being greater than the first modulus. The shutter is extendible from a shutter open position to a shutter closed position and is retractable from the shutter closed position to the shutter open position. The first and second conductive layers are connected to provide a voltage to create electrostatic forces that drive the flexible substrate to the shutter closed position. The first and second substrates are connected to one another in substantially parallel, spaced apart relation, such that a gap is defined therebetween and such that the dynamically controllable shade is located in the gap. The ratio of the lower of the second and third modulus and the first modulus is at least 10, and (a) the lower of a product of the second modulus and the second thickness and a product of the third modulus and the third thickness, divided by (b) a product of the first modulus and the first thickness, is at least 0.2.

In certain example embodiments, an insulating glass (IG) unit is provided. First and second substrates each have interior and exterior major surfaces, the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates. The shade includes: a first conductive layer provided, directly or indirectly, on the interior major surface of the first substrate; a first dielectric layer provided, directly or indirectly, on the first conductive layer on a side thereof opposite the first substrate; and a shutter including a flexible substrate. The flexible substrate includes first and second sides, the first side of the flexible substrate supporting a first polyimide layer and a second conductive layer sandwiched between the flexible substrate and the first polyimide layer, the second side of the flexible substrate supporting a second polyimide layer. The shutter is extendible from a shutter open position to a shutter closed position and is retractable from the shutter closed position to the shutter open position. A control circuit is configured to provide a voltage to create electrostatic forces that drive the flexible substrate to the shutter closed position.

A method of making an IG unit and/or shade (with or without the substrate) in accordance with the techniques described herein, and/or a method of operating such a shade, is/are contemplated herein.

In certain example embodiments, a method of operating a dynamic shade in an insulating glass (IG) unit is provided. The method comprises having an IG unit made in accordance with the techniques disclosed herein; and selectively activating the power source to move the polymer substrate between the shutter open and closed positions.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which:

FIG. 18 is a table showing data extracted from the FIG. 16 and FIG. 17 graphs;

DETAILED DESCRIPTION

Figure 1:
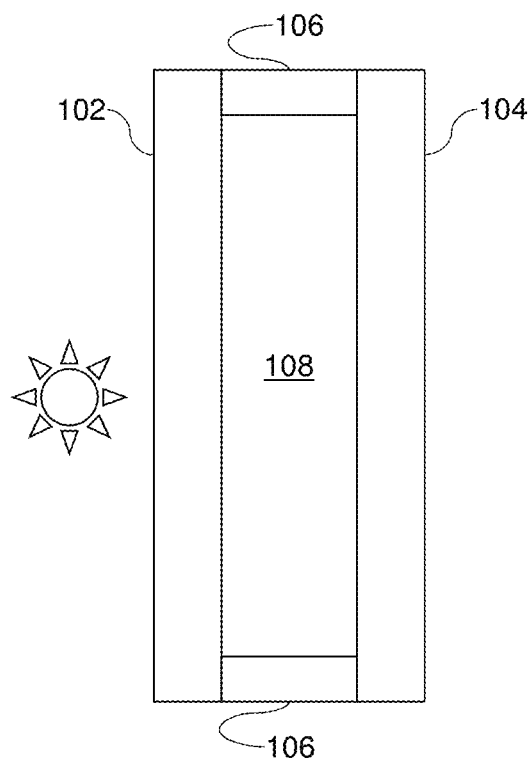
FIG. 1 is a cross-sectional, schematic view of an example insulating glass unit (IG unit or IGU)
Figure 2:
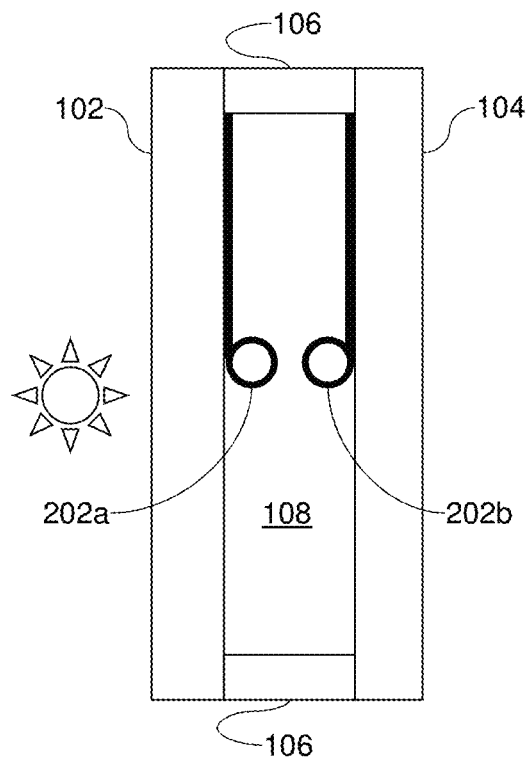
FIG. 2 is a cross-sectional, schematic view of an example IGU incorporating electric potentially-driven shades that may be used in connection with certain example embodiments.

Certain example embodiments of this invention relate to electric, potentially-driven shades that may be used with IG units, IG units including such shades, and/or methods of making the same. Referring now more particularly to the drawings, FIG. 2 is a cross-sectional, schematic view of an example insulating glass unit (IG unit or IGU) incorporating electric potentially-driven shades that may be used in connection with certain example embodiments. More specifically, FIG. 2 is similar to FIG. 1 in that first and second substantially parallel spaced apart glass substrates 102 and 104 are separated from one another using a spacer system 106, and a gap 108 is defined therebetween. First and second electric potentially-driven shades 202a and 202b are provided in the gap 108, proximate to inner major surfaces of the first and second substrates 102 and 104, respectively. As will become clearer from the description provided below, the shades 202a and 202b are controlled by the creation of an electric potential difference between the shades 202a and 202b, and conductive coatings formed on the inner surfaces of the substrates 102 and 104, respectively. As also will become clearer from the description provided below, each of shades 202a and 202b may be created using a polymer film coated with a conductive coating (e.g., a coating comprising a layer including Al, Cr, ITO, and/or the like). An aluminum-coated shade may provide for partial-to-complete reflection of visible light, and up to significant amounts of total solar energy.

The shades 202a and 202b are normally retracted (e.g., rolled up), but they rapidly extend (e.g., roll out) when an appropriate voltage is applied, in order to cover at least a portion of the substrates 102 and 104 much like, for example, a "traditional" window shade. The rolled-up shade may have a very small diameter, and typically will be much smaller than the width of the gap 108 between the first and second substrates 102 and 104, so that it can function between them and be essentially hidden from view when rolled up. The rolled-out shades 202a and 202b electrostatically attract strongly to their respective adjacent substrates 102 and 104.

The shades 202a and 202b extend along all or a portion of a vertical length of the visible or "framed" area of the substrates 102 and 104 from a retracted configuration to an extended configuration. In the retracted configuration, the shades 202a and 202b have a first surface area that substantially permits radiation transmission through the framed area. In the extended configuration, the shades 202a and 202b have a second surface area that substantially controls radiation transmission through the framed area. The shades 202a and 202b may have a width that extends across all or a portion of the horizontal width of the framed area of the substrates 102 and 104 to which they are attached.

Each of the shades 202a and 202b is disposed between the first and second substrates 102 and 104, and each preferably is attached at one end to an inner surface thereof (or a dielectric or other layer disposed thereon), near the tops thereof. An adhesive layer may be used in this regard. The shades 202a and 202b are shown partially rolled out (partially extended) in FIG. 2. The shades 202a and 202b and any adhesive layer or other mounting structure preferably are hidden from view so that the shades 202a and 202b are only seen when at least partially rolled out.

The diameter of a fully rolled-up shade preferably is about 1-5 mm but may be greater than 5 mm in certain example embodiments. Preferably, the diameter of a rolled-up shade is no greater than the width of the gap 108, which is typically about 10-25 mm (sometimes 10-15 mm), in order to help facilitate rapid and repeated roll-out and roll-up operations. Although two shades 202a and 202b are shown in the FIG. 2 example, it will be appreciated that only one shade may be provided in certain example embodiments, and it also will be appreciated that that one shade may be provided on an inner surface of either the inner or outer substrate 102 or 104. In example embodiments where there are two shades, the combined diameter thereof preferably is no greater than the width of the gap 108, e.g., to facilitate roll-out and roll-up operations of both shades.

An electronic controller may be provided to help drive the shades 202a and 202b. The electronic controller may be electrically connected to the shades 202a and 202b, as well as the substrates 102 and 104, e.g., via suitable leads or the like. The leads may be obscured from view through the assembled IG unit. The electronic controller is configured to provide an output voltage to the shades 202a and 202b with respect to the conductive layers in substrates 102 and 104, respectively. Output voltage in the range of about 100-650 V DC can be used for driving the shades 202a and 202b in certain example embodiments. An external AC or DC power supply, a DC battery, and/or the like may be used in this regard. It will be appreciated that higher or lower output voltage may be provided, e.g., depending on the fabrication parameters and materials that comprise the shades 202a and 202b, the layers on the substrates 102 and 104, etc.

The controller may be coupled to a manual switch, remote (e.g., wireless) control, or other input device, e.g., to indicate whether the shades 202a and 202b should be retracted or extended. In certain example embodiments, the electronic controller may include a processor operably coupled to a memory storing instructions for receiving and decoding control signals that, in turn, cause voltage to be selectively applied to control the extension and/or retraction of the shades 202a and 202b. Further instructions may be provided so that other functionality may be realized. For instance, a timer may be provided so that the shades 202a and 202b can be programmed to extend and retract at user-specified or other times, a temperature sensor may be provided so that the shades 202a and 202b can be programmed to extend and retract if user-specified indoor and/or outdoor temperatures are reached, light sensors may be provided so that the shades 202a and 202b can be programmed to extend and retract based on the amount of light outside of the structure, etc.

Although two shades 202a and 202b are shown in FIG. 2, as noted above, certain example embodiments may incorporate only a single shade. Furthermore, as noted above, such shades may be designed to extend vertically and horizontally along and across substantially the entire IG unit, different example embodiments may involve shades that cover only portions of the IG units in which they are disposed. In such cases, multiple shades may be provided to deliver more selectable coverage, to account for internal or external structures such as muntin bars, to simulate plantation shutters, etc. As another example, a first shade may cover a first part (e.g., top part or left/right part) of a window and a second shade may cover a second part (e.g., a bottom or right/left) of that window. As another example, first, second, and third shades may be provided to cover different approximate one-third portions of a given window.

In certain example embodiments, a locking restraint may be disposed at the bottom of the IGU, e.g., along some or all of its width, to help prevent the shades from rolling out their entire lengths. The locking restraint may be made from a conductive material, such as a metal or the like. The locking restraint also may be coated with a low dissipation factor polymer such as, for example, polypropylene, fluorinated ethylene propylene (FEP), polytetrafluoroethylene (PTFE), and/or the like.

Figure 3:
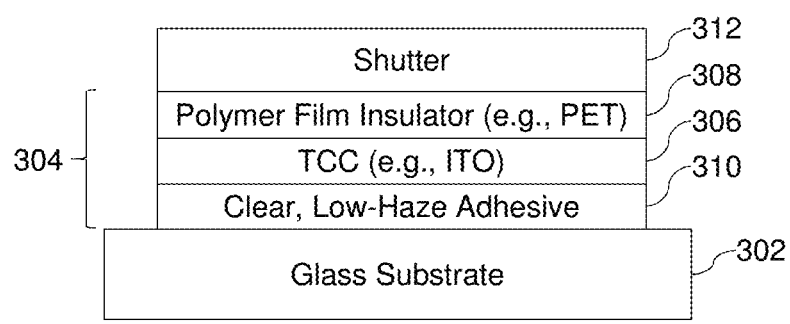
FIG. 3 is a cross-sectional view showing example on-glass components from the FIG. 2 example IGU that enable shutter action, in accordance with certain example embodiments.
Figure 4:
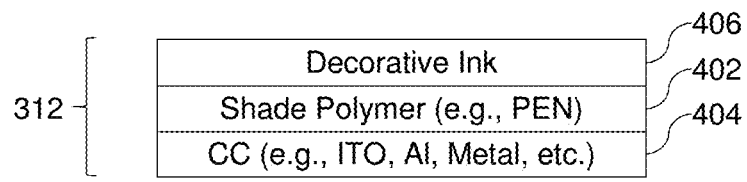
FIG. 4 is a cross-sectional view of an example shutter from the FIG. 2 example IGU, in accordance with certain example embodiments.

Example details of the operation of the shades 202a and 202b will now be provided in connection with FIGS. 3-4. More particularly, FIG. 3 is a cross-sectional view showing example "on-glass" components from the FIG. 2 example IGU that enable shutter action, in accordance with certain example embodiments; and FIG. 4 is a cross-sectional view of an example shutter from the FIG. 2 example IGU, in accordance with certain example embodiments. FIG. 3 shows a glass substrate 302, which may be used for either or both of the substrates 102 and 104 in FIG. 2. The glass substrate 302 supports on-glass components 304, as well as the shutter 312. In certain example embodiments, when unrolled, the conductor 404 may be closer to the substrate 302 than the ink layer 406. In other example embodiments, this arrangement may be reversed such that, for example, when unrolled, the conductor 404 may be farther from the substrate 302 than the ink layer 406.

The on-glass components 304 include a transparent conductor 306, along with a dielectric material 308, which may be adhered to the substrate 302 via a clear, low-haze adhesive 310 or the like. These materials preferably are substantially transparent. In certain example embodiments, the transparent conductor 306 is electrically connected via a terminal to a lead to the controller. In certain example embodiments, the transparent conductor 306 serves as a fixed electrode of a capacitor, and the dielectric material 308 serves as the dielectric of this capacitor. In such cases, a dielectric or insulator film is provided, directly or indirectly, on the first conductive layer, with the dielectric or insulator film being separate from the shutter.

It will be appreciated that it is possible to put all of the dielectric layers on the shade in certain example embodiments, thereby exposing a bare conductive (flat) substrate, e.g., a glass substrate supporting a conductive coating. For example, in certain example embodiments, the polymer film insulator 308 may be provided on/integrated as a part of the shutter 312, rather than being provided on/integrated as a part of the substrate 302. That is, the shutter 312 may further support a dielectric or insulator film 308 thereon such that, when the at least one polymer substrate is in the shutter closed position and the shutter is extended, the dielectric or insulator film directly physically contacts the first conductive layer with no other layers therebetween.

The transparent conductor 306 may be formed from any suitable material such as, for example, ITO, tin oxide (e.g., $SnO_2$ or other suitable stoichiometry), etc. The transparent conductor 306 may be 10-500 nm thick in certain example embodiments. The dielectric material 308 may be a low dissipation factor polymer in certain example embodiments. Suitable materials include, for example, polypropylene, FEP, PTFE, polyethylene terephthalate (PET), polyimide (PI), and polyethylene napthalate (PEN), etc. The dielectric material 308 may have a thickness of 1-30 microns (e.g., 4-25 microns) in certain example embodiments. The thickness of the dielectric material 308 may be selected so as to balance reliability of the shade with the amount of voltage (e.g., as thinner dielectric layers typically reduce reliability, whereas thicker dielectric layers typically require a higher applied voltage for operational purposes).

As is known, many low-emissivity (low-E) coatings are conductive. Thus, in certain example embodiments, a low-E coating may be used in place of the transparent conductor 306 in certain example embodiments. The low-E coating may be a silver-based low-E coating, e.g., where one, two, three, or more layers comprising Ag may be sandwiched between dielectric layers. In such cases, the need for the adhesive 310 may be reduced or completely eliminated.

The shutter 312 may include a resilient layer 402. In certain example embodiments, a conductor 404 may be used on one side of the resilient layer 402, and a decorative ink 406 optionally may be applied to the other side. In certain example embodiments, the conductor 404 may be transparent and, as indicated, the decorative ink 406 is optional. In certain example embodiments, the conductor 404 and/or the decorative ink 406 may be translucent or otherwise impart coloration or aesthetic features to the shutter 312. In certain example embodiments, the resilient layer 402 may be formed from a shrinkable polymer such as, for example, PEN, PET, polyphenylene sulfide (PPS), polyether ether ketone (PEEK), etc. The resilient layer 402 may be 1-25 microns thick in certain example embodiments. The conductor 404 may be formed from the same or different material as that used for conductor 306, in different example embodiments. Metal or metal oxide materials may be used, for example. In certain example embodiments, a 10-50 nm thick material including a layer comprising, for example, ITO, Al, Ni, NiCr, tin oxide, and/or the like, may be used. In certain example embodiments, the sheet resistance of the conductor 404 may be in the range of 40-200 ohms/square. It will be appreciated that different conductivity values and/or thicknesses (such as, for example, the example thicknesses set forth in the tables below) may be used in different example embodiments.

The decorative ink 406 may include pigments, particles, and/or other materials that selectively reflect and/or absorb desired visible colors and/or infrared radiation. In certain example embodiments, additional decorative ink may be applied to the shutter 312 on a side of the conductor 404 opposite the resilient layer 402.

As FIG. 2 shows, the shades 202a and 202b ordinarily are coiled as spiral rolls, with an outer end of the spiral affixed by an adhesive to the substrates 102 and 104 (e.g., or the dielectric thereon). The conductor 404 may be electrically connected via a terminal to a lead or the like and may serve as a variable electrode of a capacitor having the conductor 306 as its fixed electrode and the dielectric 308 as its dielectric.

When an electrical drive is provided between the variable electrode and the fixed electrode, e.g., when an electric drive of voltage or electrical charge or current is applied between the conductor 404 of the shutter 312 and the conductor 306 on the substrate 302, the shutter 312 is pulled toward the substrate 302 via an electrostatic force created by the potential difference between the two electrodes. The pull on the variable electrode causes the coiled shade to roll out. The electrostatic force on the variable electrode causes the shutter 312 to be held securely against the fixed electrode of the substrate 302. As a result, the ink coating layer 406 of the shade helps selectively reflect or absorb certain visible colors and/or infrared radiation by being interposed in the light path through the IG unit. In this way, the rolled-out shade helps control radiation transmission by selectively blocking and/or reflecting certain light or other radiation from passing through the IG unit, and thereby changes the overall function of the IG unit from being transmissive to being partially or selectively transmissive, or even opaque in some instances.

When the electrical drive between the variable electrode and the fixed electrode is removed, the electrostatic force on the variable electrode is likewise removed. The spring constant present in the resilient layer 402 and the conductor 404 causes the shade to roll up back to its original, tightly-wound position. Because movement of the shade is controlled by a primarily capacitive circuit, current essentially only flows while the shade is either rolling out or rolling up. As a result, the average power consumption of the shade is extremely low. In this way, several standard AA batteries may be used to operate the shade for years, at least in some instances.

In one example, the substrate 302 may be 3 mm thick clear glass commercially available from the assignee. An acrylic-based adhesive having a low haze may be used for adhesive layer 310. Sputtered ITO having a resistance of 100-300 ohms/square may be used for the conductor 306. The polymer film may be a low-haze (e.g., <1% haze) PET material that is 12 microns thick. A PVC-based ink available from Sun Chemical Inc. applied to 3-8 microns thickness may be used as the decorative ink 406. Other inks may of course be used in different example embodiments. A PEN material commercially available from DuPont that is 6, 12, or 25 microns thick may be used as the resilient layer 402. Other materials may of course be used in different example embodiments. For an opaque conductor, evaporated Al that has a nominal thickness of 375 nm may be used. For a transparent option, sputtered ITO may be used. In both cases, the sheet resistance may be 100-400 ohms/square. (If aluminum is used, the sheet resistance may be lower than 100 ohms/square; in certain example embodiments, it even may be less than 1 ohm/square.) The ITO or other conductive material(s) may be sputtered onto, or otherwise formed on, their respective polymer carrier layers in certain example embodiments. Of course, these example materials, thicknesses, electrical properties, and their various combinations and sub-combinations, etc., should not be deemed limiting unless specifically claimed.

As will be appreciated from the description above, the dynamic shade mechanism uses a coiled polymer with a conductive layer. In certain example embodiments, the conductor may be formed to be integral with the polymer 402, or it may be an extrinsic coating that is applied, deposited, or otherwise formed on the polymer 402. As also mentioned above, decorative ink 406 may be used together with a transparent conductor material (e.g., based on ITO) and/or an only partially transparent or opaque conductive layer. An opaque or only partially transparent conductive layer may obviate the need for ink in certain example embodiments. In this regard, a metal or substantially metallic material may be used in certain example embodiments. Aluminum is one example material that may be used with or without a decorative ink.

One or more overcoat layers may be provided on the conductor to help reduce the visible light reflection and/or change the color of the shade to provide a more aesthetically pleasing product, and/or by "splitting" the conductor so that a phase shifter layer appears therebetween. Overcoats thus may be included to improve the aesthetic appearance of the overall shade. The shutter 312 thus may include a reflection-reducing overcoat, dielectric mirror overcoat, or the like. Such reflection-reducing overcoats and dielectric mirror overcoats may be provided over a conductor 404 and on a major surface of the shade polymer 402 comprising (for example) PEN opposite decorative ink 406. It will be appreciated, however, that the ink 406 need not be provided, e.g., if the conductor 404 is not transparent. Mirror coatings such as, for example, Al, may obviate the need for decorative ink 406. It also will be appreciated that the reflection-reducing overcoat and the dielectric mirror overcoat may be provided on major surfaces of the shade polymer 402 comprising (for example) PEN opposite the conductor 404 in certain example embodiments.

In addition to or in place of using optical interference techniques to reduce reflection, it also is possible to add a textured surface to the base polymer, modifying the conductive layer chemically or physically, and/or add an ink layer, e.g., to accomplish the same or similar ends, achieve further reductions in unwanted reflection, etc.

Given that the thin film and/or other materials comprising the shutter should survive numerous rolling and unrolling operations in accordance with the functioning of the overall shade, it will be appreciated that the materials may be selected, and that the overall layer stack formed, to have mechanical and/or other properties that facilitate the same. For example, an excess of stress in a thin film layer stack typically is seen as disadvantageous. However, in some instances, excess stress can lead to cracking, "delamination"/removal, and/or other damage to the conductor 404 and/or an overcoat layer or layers formed thereon. Thus, low stress (and in particular low tensile stress) may be particularly desirable in connection with the layer(s) formed on the shutters' polymer bases in certain example embodiments.

In this regard, the adhesion of sputtered thin films depends on, among other things, the stress in the depositing film. One way stress can be adjusted is with deposition pressure. Stress versus sputter pressure does not follow a monotonic curve but instead inflects at a transition pressure that in essence is unique for each material and is a function of the ratio of the material's vaporization temperature (or melting temperature) to the substrate temperature. Stress engineering can be accomplished via gas pressure optimizations, bearing these guideposts in mind.

Other physical and mechanical properties of the shade that may be taken into account include the elastic modulus of the polymer and the layers formed thereon, the density ratio of the layers (which may have an effect on stress/strain), etc. These properties may be balanced with their effects on internal reflection, conductivity, and/or the like.

As is known, temperatures internal to an IG unit may become quite elevated. For example, it has been observed that an IG unit in accordance with the FIG. 2 example and including a black pigment may reach a temperature of 87 degrees C., e.g., if the black portion of the shade is facing the sun in elevated temperature, high solar radiation climates (such as, for example, in areas of the southwest United States such as Arizona). The use of a PEN material for the rollable/unrollable polymer may be advantageous, as PEN has a higher glass transition temperature (~120 degrees C.), compared to other common polymers such as PET (Tg=67-81 degrees C.), Poly Propylene or PP (Tg=~32 degrees C.). Yet if the PEN is exposed to temperatures approaching the glass transition temperature, the performance of the material's otherwise advantageous mechanical properties (including its elastic modulus, yield strength, tensile strength, stress relaxation modulus, etc.) may degrade overtime, especially with elevated temperature exposure. If these mechanical properties degrade significantly, the shade may no longer function (e.g., the shade will not retract).

In order to help the shade better withstand elevated temperature environments, a substitution from PEN to polymers with better elevated temperature resistance may be advantageous. Two potential polymers include PEEK and Polyimide (PI or Kapton). PEEK has a Tg of ~142 degrees C. and Kapton HN has a Tg of ~380 degrees C. Both of these materials have better mechanical properties in elevated temperature environments, compared to PEN. This is especially true at temperature above 100 degrees C. The following chart demonstrates this, referencing mechanical properties of PEN (Teonex), PEEK, and PI (Kapton HN). UTS stands for ultimate tensile strength, in the chart.

|  |  | PEN | PEEK | PI |
|---|---|---|---|---|
| 25 degrees C. | UTS (psi) | 39,000 | 16,000 | 33,500 |
|  | Modulus (psi) | 880,000 | 520,000 | 370,000 |
|  | Yield (psi) | 17,500 |  | 10,000 |
| 200 degrees C. | UTS (psi) | 13,000 | 8,000 | 20,000 |
|  | Modulus (psi) |  |  | 290,000 |
|  | Yield (psi) | <1,000 |  | 6,000 |
| Tg |  | ~121 degrees C. | ~143 degrees C. | ~380 degrees C. |

It will be appreciated that the modification of the shade base material from its current material (PEN) to an alternate polymer (e.g., PEEK or PI/Kapton) that has increased elevated temperature mechanical properties may be advantageous in the sense that it may enable the shade to better withstand internal IG temperatures, especially if the shade is installed in higher temperature climates. It will be appreciated that the use of an alternative polymer may be used in connection with the shutter and/or the on-glass layer in certain example embodiments.

In addition, or as an alternative, certain example embodiments may use a dyed polymer material. For example, a dyed PEN, PEEK, PI/Kapton, or other polymer may be used to created shades with an assortment of colors and/or aesthetics. For instance, dyed polymers may be advantageous for embodiments in transparent/translucent applications, e.g., where the shade conductive layer is a transparent conductive coating or the like.

Alternate conductive materials that beneficially modify the spring force of the coiled shade to make it usable for various lengths may be used. In this regard, properties of the conductive layer that increase the strength of the coil include an increase in the elastic modulus, an increase in the difference in coefficient of thermal expansion (CTE) between the polymer substrate and the conductive layer, and an increase in the elastic modulus to density ratio. Some of the pure metals that can be used to increase coil strength compared to Al or Cr include Ni, W, Mo, Ti, and Ta. The elastic modulus of studied metal layers ranged from 70 GPa for Al to 330 GPa for Mo. The CTE of studied metal layers ranged from $23.5 \times 10^{-6}$/k for Al down to $4.8 \times 10^{-6}$/k for Mo. In general, the higher the elastic modulus, the higher the CTE mismatch between the PEN or other polymer and the metal, the lower the density, etc., the better the material selection in terms of coil formation. It has been found that incorporating Mo and Ti based conductive layers into shades has resulted in a spring force of the coil that is significantly higher than that which is achievable with Al. For example, a polymer substrate based on PEN, PEEK, PI, or the like, may support (in order moving away from the substrate) a layer comprising Al followed by a layer comprising Mo. Thin film layer(s) in a conductive coating and/or a conductive coating itself with a greater modulus and lower CTE than Al may be provided.

A PEN, PI, or other polymer substrate used as a shutter may support a thin layer comprising Al for stress-engineering purposes, with a conductive layer comprising Mo, Ti, or the like directly or indirectly thereon. The conductive layer may support a corrosion-resistant layer comprising Al, Ti, stainless steel, or the like. The side of the substrate opposite these layers optionally may support a decorative ink or the like.

Figure 5:
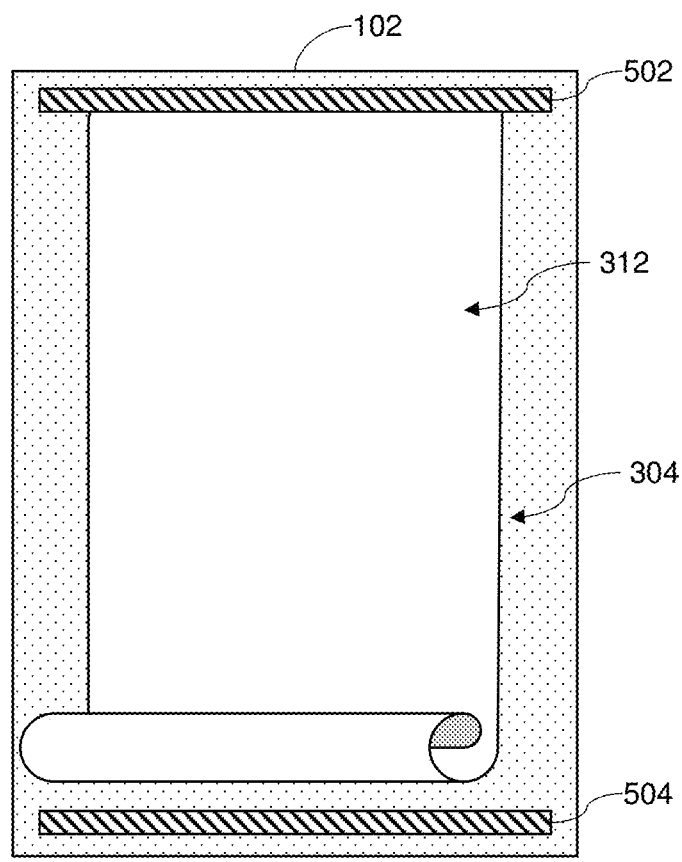
FIG. 5 is a plan view of a substrate incorporating on-glass components from the FIG. 3 example and shutter components from the FIG. 4 example, in accordance with certain example embodiments.

FIG. 5 is a plan view of a substrate 102 incorporating on-glass components 304 from the FIG. 3 example and shutter components 312 from the FIG. 4 example, in accordance with certain example embodiments. The shutter 312 extends from the anchor bar 502 toward the stop 504 when moving to the shutter closed position. The shutter retracts from the stop 504 towards the anchor bar 502 when moving to the shutter open position.

Certain example embodiments may include microscopic perforations or through-holes that allow light to pass through the shade and provide progressive amounts of solar transmittance based on the angle of the sun.

Further manufacturing, operation, and/or other details and alternatives may be implemented. See, for example, U.S. Pat. Nos. 8,982,441; 8,736,938; 8,134,112; 8,035,075; 7,705,826; and 7,645,977, as well as U.S. application Ser. No. 16/028,546 filed Jul. 6, 2018; the entire contents of each of which is hereby incorporated herein by reference. Among other things, perforation configurations, polymer materials, conductive coating designs, stress engineering concepts, building-integrated photovoltaic (BIPV), and other details are disclosed therein and at least those teachings may be incorporated into certain example embodiments.

As will be appreciated from the description above, one issue associated with the dynamic shade design relates to formation of the retractable shutter. In particular, care may be taken to select and implement materials with appropriate mechanical properties to enable automatic retraction over time. It oftentimes will be important to tightly control manufacturing parameters to ensure that the shutter is properly created so as to have a spring force sufficient for retraction, and to ensure that the spring force remains sufficient to cause retraction over the life of the window or other product into which the shutter is integrated. If the spring force is not sufficient, or if it degrades over time, the shutter may become "stuck" in an extended or partially extended position. This may be the case even if voltage is not applied, simply because the spring force will be insufficient to cause the re-rolling. And because of the closed system, it can be difficult and sometimes even impossible to repair and/or replace faulty shutters and/or shutters that have "worn out" over time, etc.

Figure 6A:
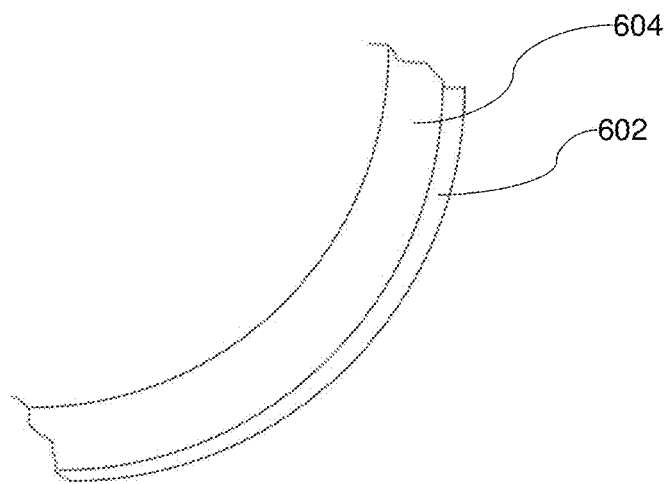
FIG. 6A is a partial schematic view of a retracted shutter.
Figure 6B:
FIG. 6B is a partial schematic view of the FIG. 6A shutter in an extended state.

The design shown in and described in connection with FIGS. 3-4 has been used successfully to produce commercially-available dynamic shade systems. In the dynamic shade, it would be desirable to have the conductive layer(s) on the shutter be relaxed in the coiled state so that stresses develop when they are flattened. This design helps ensure that the rolled-out shade coils up again. The inventors have realized that stress engineering performed with respect to the shutter can be used to improve the functioning and/or longevity of such existing dynamic shade systems. FIGS. 6A-6B help demonstrate the stress regime in arrangements like those presented in FIGS. 3-4 and, thus, arrangements to which stress regime changes can be made to provide further functionality and/or longevity related improvements. FIG. 6A is a partial schematic view of a retracted shutter. The FIG. 6A shutter is in a relaxed state, as pertains to stress and strain induced therein. For ease of understanding, FIG. 6A shows only a high modulus of elasticity layer 602 and a low modulus of elasticity layer 604. The high modulus layer 602 is the conductive coating, which may be a layer comprising Al, Mo, ITO, and/or the like. The low modulus of elasticity layer 604 is the resilient layer, which may comprise a polymer material such as, for example, PEN, PI, PEEK, and/or the like. As will be appreciated from the above, the conductive layer is relaxed in this state. FIG. 6B is a partial schematic view of the FIG. 6A shutter in an extended state. Because the shutter is extended, stress is induced therein, particularly with respect to the conductive layer. The arrows facing each other indicate regions of compressive stress. The dashed line represents the neutral axis, designated with reference numeral 606. The neutral axis 606 is an axis in the cross-section of the shutter comprising the high and low modulus layers 602 and 604 along which there are no longitudinal stresses or strains. The neutral axis 606 resides in the bulk of the low modulus layer 604, closer to the low modulus layer 602 than the center of the high modulus layer 604. Thus, a portion of the low modulus layer 604 adjacent to the high modulus layer 602 is under compressive stress, whereas the portion of the low modulus layer 604 on the side of the neutral axis 606 opposite the high modulus layer 602 is under tensile stress.

Certain example embodiments enhance the strength of the system shown schematically in FIGS. 6A-6B and provide a high spring force shade. More particularly, certain example embodiments provide a double-sided high modulus layer configuration, which increases strength relative to a single-sided configuration having the same total thickness by maximizing the distance to the neutral axis. The increased distance to the neutral axis results in higher strain/stress/stored energy in the high modulus layers.

Figure 7A:
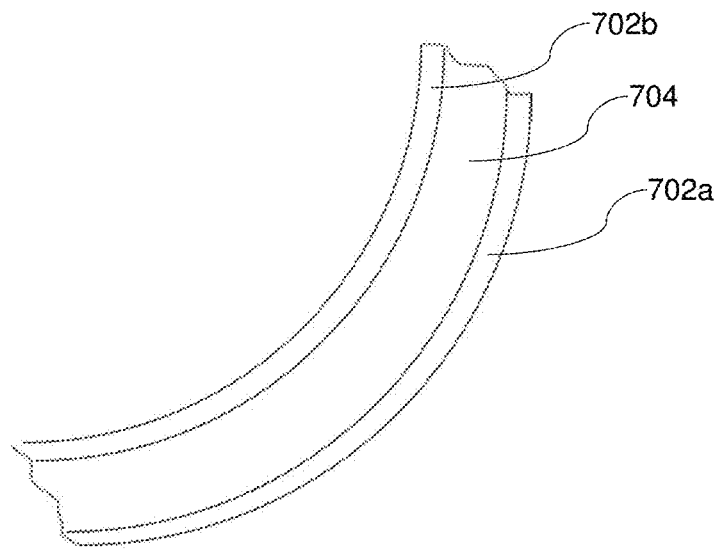
FIG. 7A is a partial schematic view of a retracted shutter with a double-sided high modulus layer configuration, in accordance with certain example embodiments.
Figure 7B:
FIG. 7B is a partial schematic view of the FIG. 7A shutter in an extended state, in accordance with certain example embodiments.

FIGS. 7A-7B schematically illustrate this double-sided arrangement of certain example embodiments. That is, FIG. 7A is a partial schematic view of a retracted shutter with a double-sided high modulus layer configuration, in accordance with certain example embodiments. FIG. 7B is a partial schematic view of the FIG. 7A shutter in an extended state, in accordance with certain example embodiments. As shown in FIGS. 7A-7B, a low modulus layer 704 is sandwiched between first and second high modulus layers 702a-702b. The neutral axis 706 in FIG. 7B is in the center of the low modulus layer 704, maximizing the distance to the neural axis and improving strain, stress, and stored energy in the high modulus layers 702a-702b. In certain example embodiments, the neutral axis 706 may not be in the exact center of the overall shutter but instead may be substantially centered through the cross-section thereof. For instance, in certain example embodiments, taking into account the entire thickness of the shutter (including the low modulus layer 704 and all layers formed thereon), the distance that the neutral axis is from the exact center of the shutter preferably is no more than 25% of thickness of the shutter, more preferably no more than 20%, still more preferably no more than 15%, and possibly no more than 5-10%.

The cutoff between what is considered a high modulus and a low modulus can be determined by those skilled in the art. For instance, as those skilled in the art will recognize, in this type of application, a high modulus typically will be at least 60 GPa, and a low modulus typically will be less than or equal to 6 GPa. There typically will be a difference of at least 10× between high and low modulus values.

Figure 8:
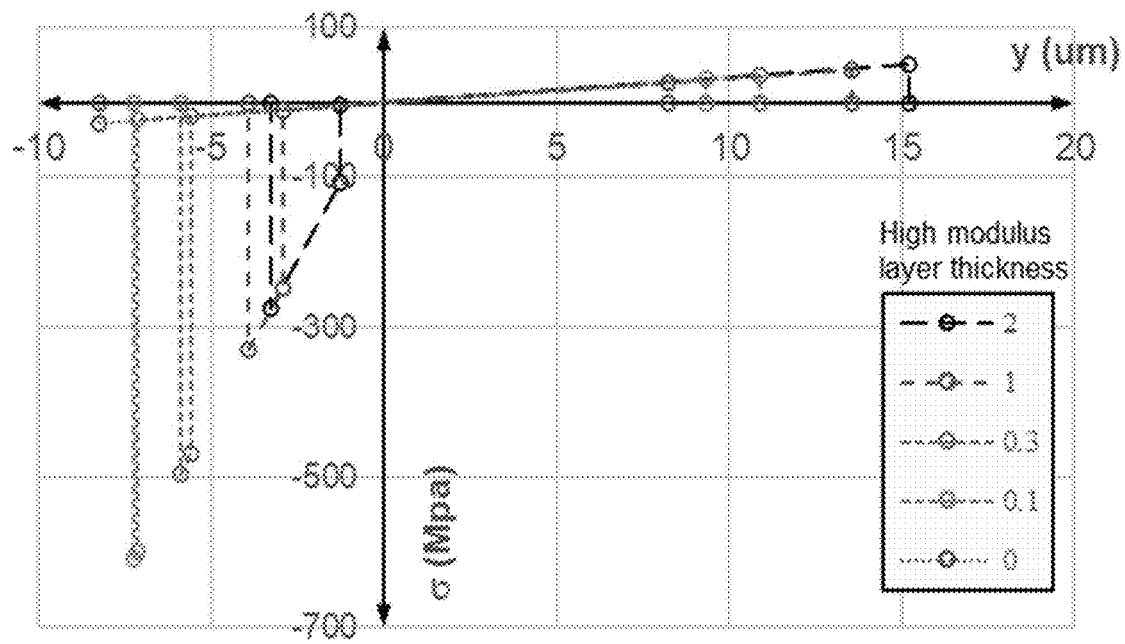
FIG. 8 is a graph plotting the stress profile for an arrangement with a high modulus layer provided on only one side of a polymer material, when the shutter is extended.
Figure 9:
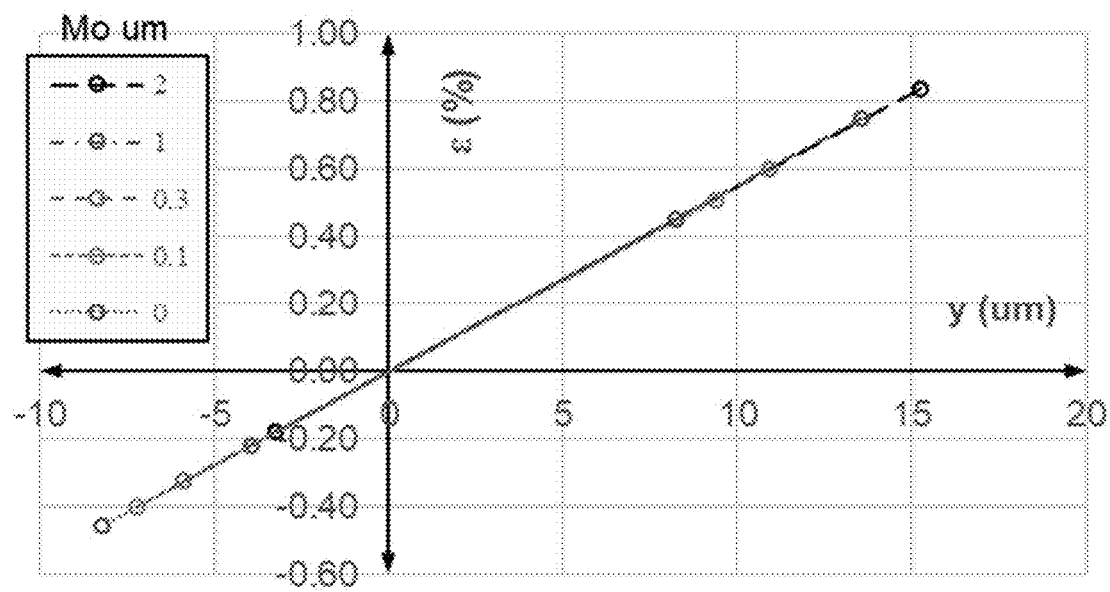
FIG. 9 is similar to FIG. 8 in that it plots strain against thickness of the arrangement including a shutter having a single high modulus layer.

FIG. 8 is a graph plotting the stress profile for an arrangement with a high modulus layer provided on only one side of a polymer material, when the shutter is extended. The high modulus layer in the FIG. 8 example is a layer comprising Mo, and the low modulus layer in the FIG. 8 example is PEN. The thicknesses of the high modulus layer are in microns, and a zero micron thickness is provided for reference to show characteristics of the low modulus layer by itself. The FIG. 8 graph shows peak stress for different thicknesses of the high modulus layer along the y-axis. The negative values are considered compressive stresses, whereas the positive values are considered tensile stresses. The x-axis in FIG. 8 references the distance from the neutral axis. FIG. 9 is similar to FIG. 8 in that it plots strain profile of the arrangement including a shutter having a single high modulus layer.

As will be appreciated from FIG. 8, when no high modulus layer is provided (0 micron thickness), the profile is symmetrical. That is, the maximum compressive and tensile stresses are substantially equal, and the tensile and compressive stresses are substantially equidistant from 0 on the x-axis, which represents the cross-sectional center of the PEN.

As thickness for the metal is added, the profile shifts the neutral axis further and further towards the metal layer. At the same time, the amount of integrated stress is larger, but the peak stress decreases because of the movement.

Figure 10:
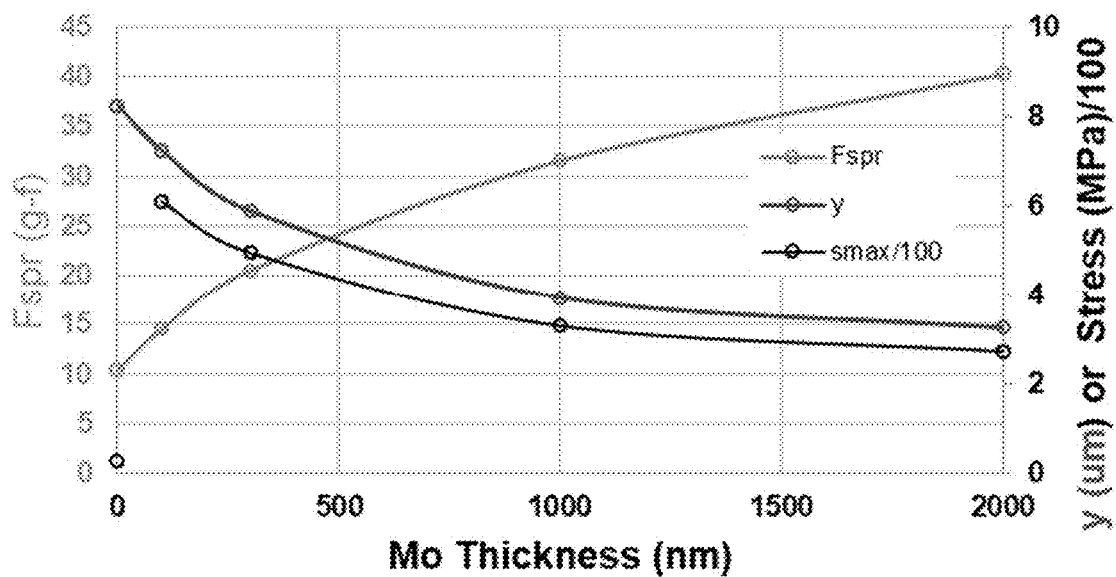
FIG. 10 is a graph plotting modelled responses to metal layer thickness increases for the arrangement with the high modulus layer provided on only one side of the polymer material.

The consequence of these shifts is shown in greater detail in FIG. 10. That is, FIG. 10 is a graph plotting modelled responses to metal layer thickness increases for the arrangement with the high modulus layer provided on only one side of the polymer material. With increasing metal layer thickness, as noted above, the neutral axis shifts towards the metal layer so that the compressive and tensile forces balance. However, the peak stress in the metal layer decrease because of the reduction in strain. Consequently, the increase in stored energy and thus spring force with metal layer thickness is non-linear and falls off as the metal layer thickness increases.

Figure 11:
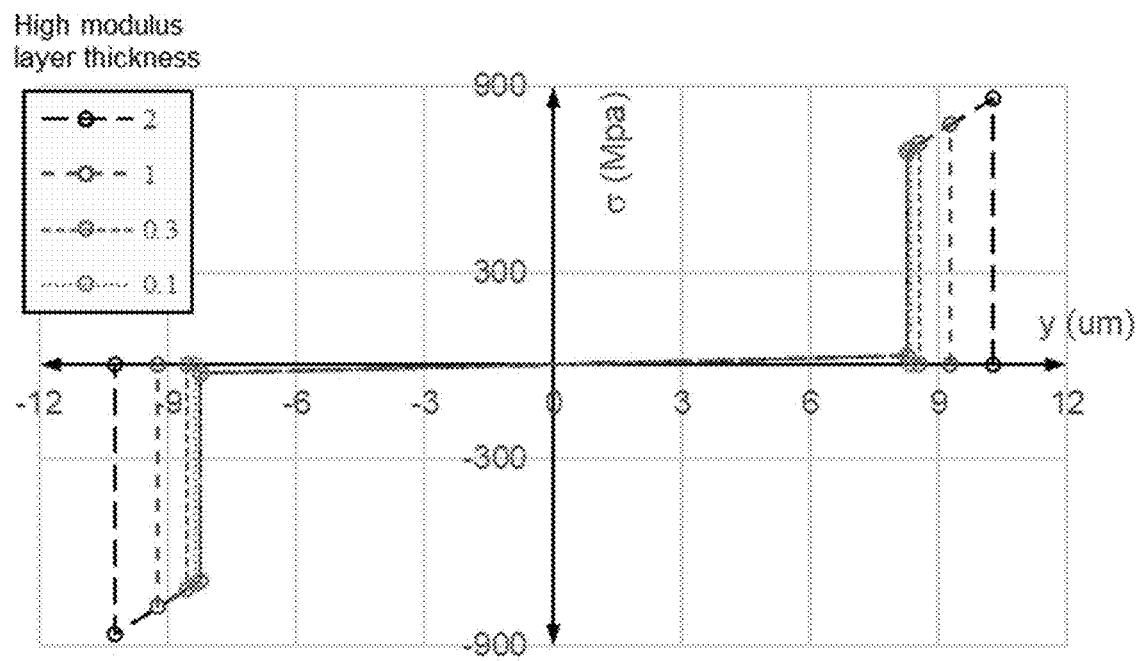
FIG. 11 is a graph plotting the stress profile for an arrangement with a high modulus layer provided on each side of a polymer material, when the shutter is extended, in accordance with certain example embodiments.
Figure 12:
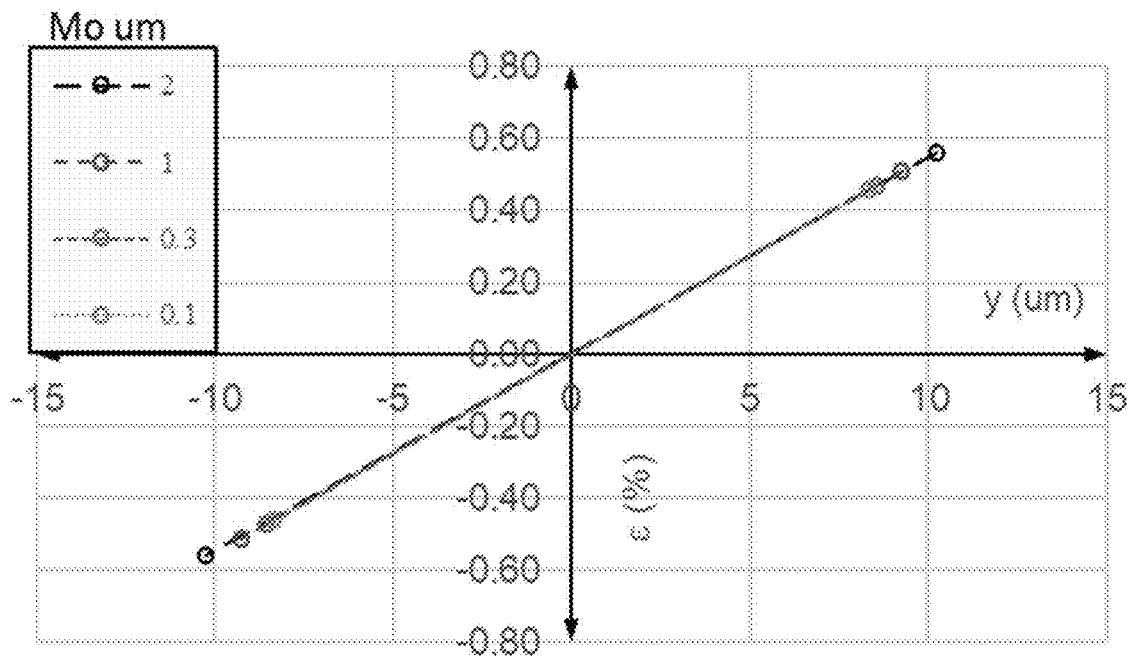
FIG. 12 is similar to FIG. 11 in that it plots strain against thickness of the arrangement including a shutter having a high modulus layers on opposing sides of the low modulus layer, in accordance with certain example embodiments.

FIGS. 11-12 are similar to FIGS. 8-9, except that FIGS. 11-12 relate to shutters with high modulus layers on opposing sides of the low modulus later. Thus, FIG. 11 is a graph plotting the stress profile for an arrangement with a high modulus layer provided on each side of a polymer material, when the shutter is extended, in accordance with certain example embodiments; and FIG. 12 is similar to FIG. 11 in that it plots the strain profile of the arrangement including a shutter having a high modulus layers on opposing sides of the low modulus layer, in accordance with certain example embodiments. The thicknesses for the metal are the same in FIGS. 11-12 as in FIGS. 8-9, except that the metal is split evenly among the two high modulus layers for FIGS. 11-12 whereas it the entire thickness is provided in a single metal layer for FIGS. 8-9.

As will be appreciated from FIG. 11 (and FIG. 8), when no high modulus layer is provided (0 micron thickness), the profile is symmetrical. That is, the maximum compressive and tensile stresses are substantially equal, and the tensile and compressive stresses are substantially equidistant from the neutral axis, which is at the cross-sectional center of the PEN. As thickness for the metal is added in the symmetrical metal layer arrangement used to develop the FIG. 11 data, however, the neutral axis does not shift in an appreciable amount towards either metal layer or elsewhere as it does in FIG. 8 for the single-sided arrangement. In other words, for increasing layers of metal thickness, the profile remains substantially symmetrical, with the neutral axis remaining in place and with the peak stresses remaining substantially equal.

Differently stated, with metal provided on both sides, spikes of stress are provided on both sides of the low modulus layer. These spikes develop as the total metal thickness increases. But the spikes balance out in magnitude and location, and the neutral axis therefore does not move. Moreover, in comparison with the FIG. 8 graph, the peak stresses do not drop and instead increase gradually with metal layer thickness.

Figure 13:
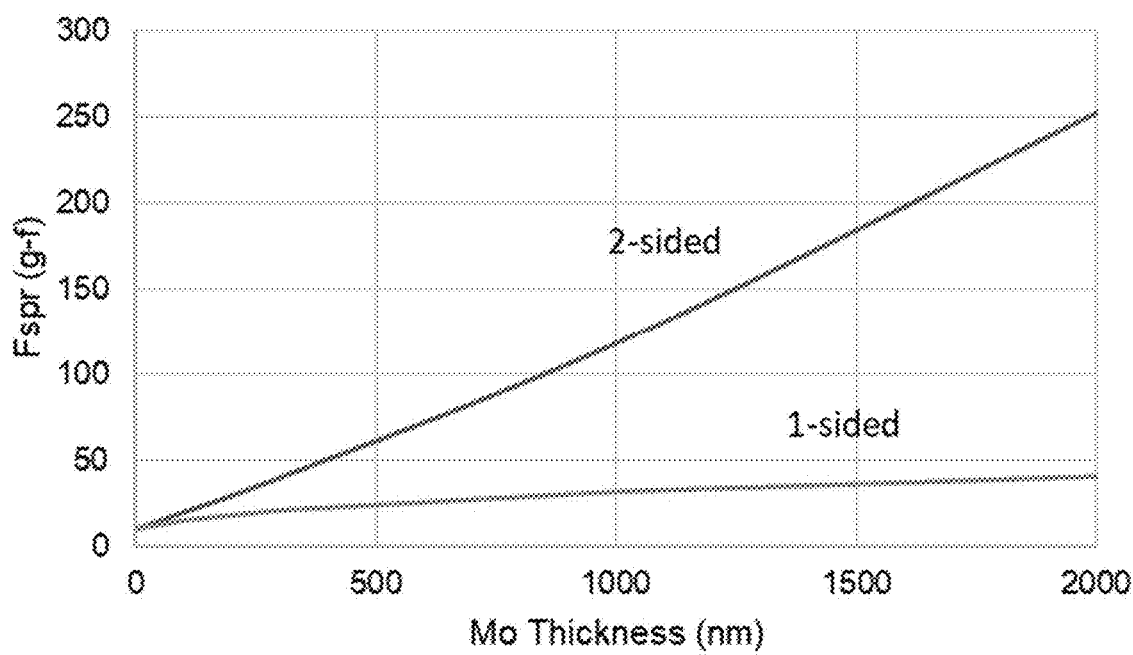
FIG. 13 is a graph comparing spring forces associated with different high modulus material thicknesses for a shutter including a single high modulus layer and for a shutter including high modulus layers on opposing surfaces thereof.

The consequence of these behaviors of the symmetrical metal layer arrangement is shown in FIG. 13, and the comparison with the single metal layer arrangement is evident. That is, FIG. 13 is a graph comparing spring forces associated with different high modulus material thicknesses for a shutter including a single high modulus layer and for a shutter including high modulus layers on opposing surfaces thereof. As can be seen, as the total metal thickness increases, the spring force for the symmetrical two-sided arrangement increases dramatically compared to the single-sided arrangement. Both spikes in the FIG. 11 graph contribute to the stored energy and spring force and, because they do not drop compared to the FIG. 8 example, the spring force produced is much higher.

There is an unexpected and synergistic amount of spring force added with the dual-sided arrangement compared to the single-sided arrangement, even for the same total metal thickness. It is believed that this synergistic effect relates to the fact that the neutral axis does not move, or does not move much, especially when compared to the large amount of movement encountered in the single-sided approach.

To understand how the shutter behaves in the single-sided and symmetrical arrangements, the dynamic shade system was modelled as a "constant force spring" (CFS). Typically a narrow thin metal strip tightly wound on a pulley, a CFS provides a relatively constant load. CFSs are good general purpose springs that have been used to model a variety of applications, ranging from counterweights in windows to antennae deployment on satellites. The general force equation for a CFS is:

$$F \propto Ebt^3/R^2$$

where F is spring force, E is modulus, b is spring width, t is spring thickness, and R is coil radius.

When a multilayer coil is considered, the generalized CFS equation becomes:

$$F = 1/2kET[1/R_n^2 - (1/R_n - 1/R_c)^2]$$

where F is spring force, k is a constant related to Poisson correction, E' is generalized modulus, I is total moment of inertia, $R_n$ is natural radius (with no stresses), and $R_c$ is constrained radius imposed by the rest of the coil.

The total moment of inertia I is represented by the following equalities:

$$I = \sum_{i=1}^{n} I_i = \sum_{i=1}^{n} \frac{(z_{ic}^3 - z_{(i+1)c}^3)b_i}{3}$$

where $I_i$ is the moment of inertia for the ith layer, $Z_{ic}$ is the coordinate of the ith interface relative to the neutral axis, and $b_i$ is the generalized width of the ith layer.

The position on the neutral axis is given by:

$$y_c = \frac{\sum_{i=1}^{m} y_{ci} A_i}{\sum_{i=1}^{m} A_i}$$

where $y_c$ is the coordinate of the center plane of the ith layer relative to the first interface (outer surface of layer 1), and where $A_i$ is the generalized area of the ith layer. Details regarding the computation of the generalized parameters (E', $b_i$ and $A_i$) can be found in Wyser Y, et al, *Packag. Technol. Sci.* 2001; 14, 97-108.

Figure 14:
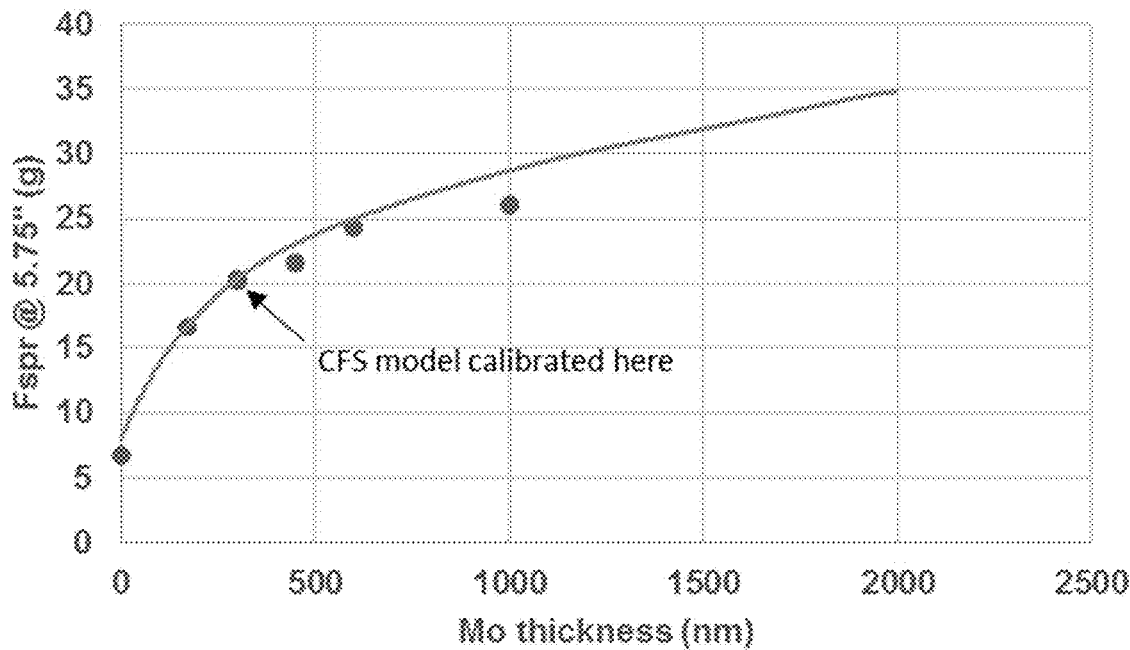
FIG. 14 is a graph plotting measured and modelled spring forces associated with different high modulus material thicknesses.

FIG. 14 is a graph plotting modelled and experimentally-obtained spring force data for a single-sided arrangement. In FIG. 14, the points represent the experimentally-obtained data, and the line represents the modelled data. Mo was used as the metal, and a Mo thickness of 300 nm was used to calibrate the model. The model calibration included setting values for the multilayer coil formula provided above and, in particular, the modulus of the Mo layer, which varies with deposition parameters and is difficult to determine experimentally. The calibrated CFS model fit the measured spring force at other Mo thicknesses well without other parameter adjustments.

Figure 15A:
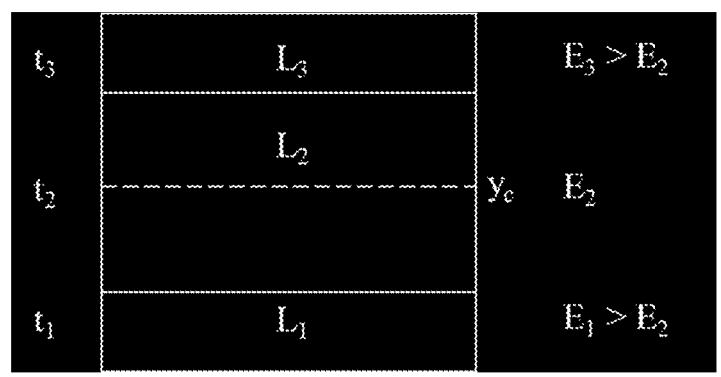
FIGS. 15A-15B show how the symmetrical high modulus layers and single-sided high modulus arrangements were modelled.
Figure 15B:
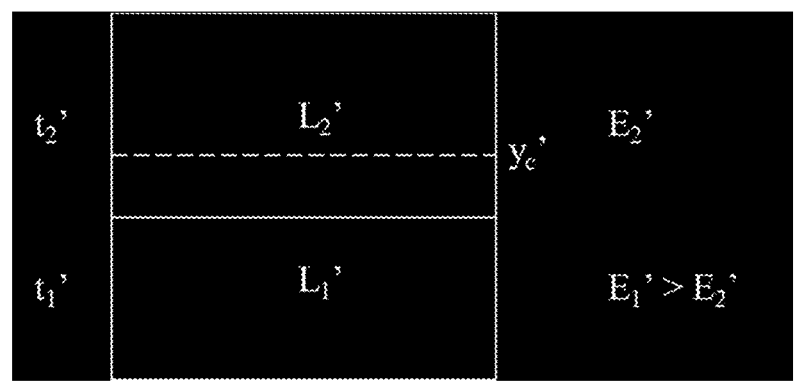

FIGS. 15A-15B show how the symmetrical high modulus layers and single-sided high modulus arrangements were modelled. In FIG. 15A, layers $L_1$ and $L_3$ are high modulus layers, with thicknesses $t_1$ and $t_3$. Layer $L_2$ is the low modulus layer. The dashed line $y_c$ shows the position of the neutral axis in this arrangement. Layer $L_2$ has a modulus of $E_2$, which is less than the $E_1$ and $E_3$ modulus values that are provided for Layers $L_1$ and $L_3$ respectively. In certain example embodiments, the $E_1$ and $E_3$ modulus values may be the same or substantially the same. In other cases, they simply may be higher than the layer $L_2$ modulus of $E_2$.

In FIG. 15B, there is a single high modulus layer $L_1'$ having a modulus of $E_1'$, which is higher than the modulus $E_2'$ for the low module layer $L_2'$. Layer $L_1'$ has a thickness of $t_1'$, and layer $L_2'$ has a thickness of $t_2'$. The dashed line $y_c'$ shows the position of the neutral axis in the FIG. 15B arrangement.

Figure 16:
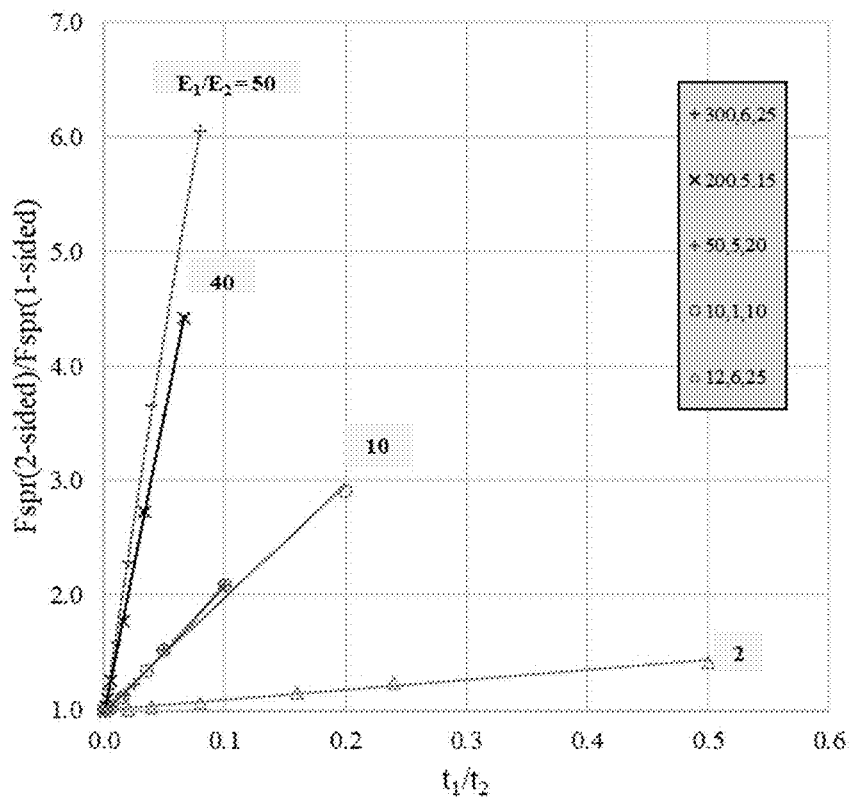
FIG. 16 is a graph showing the gain in spring force as a function of normalized high modulus layer thickness.

FIG. 16 is a graph showing the gain in spring force as a function of normalized high modulus layer thickness. The y-axis is the ratio of the double-sided to single-sided spring force, and the x-axis is the high modulus to low modulus thickness ratio. The spring force gain was modeled for symmetric and asymmetric double-sided cases with the total high modulus and low modulus layer thicknesses constrained to equal the single-sided case (t1+t3=t1' and t2=t2'). The data in FIG. 16 was generated from the symmetric case where t1=t3 and E1=E3. However, synergistic gain in spring force also occurs in the asymmetric case as long as both E1 and E3 are greater than E2. In general, FIG. 16 clearly shows that the rate of synergistic gain depends on the high to low modulus ratio (E1/E2).

Figure 17:
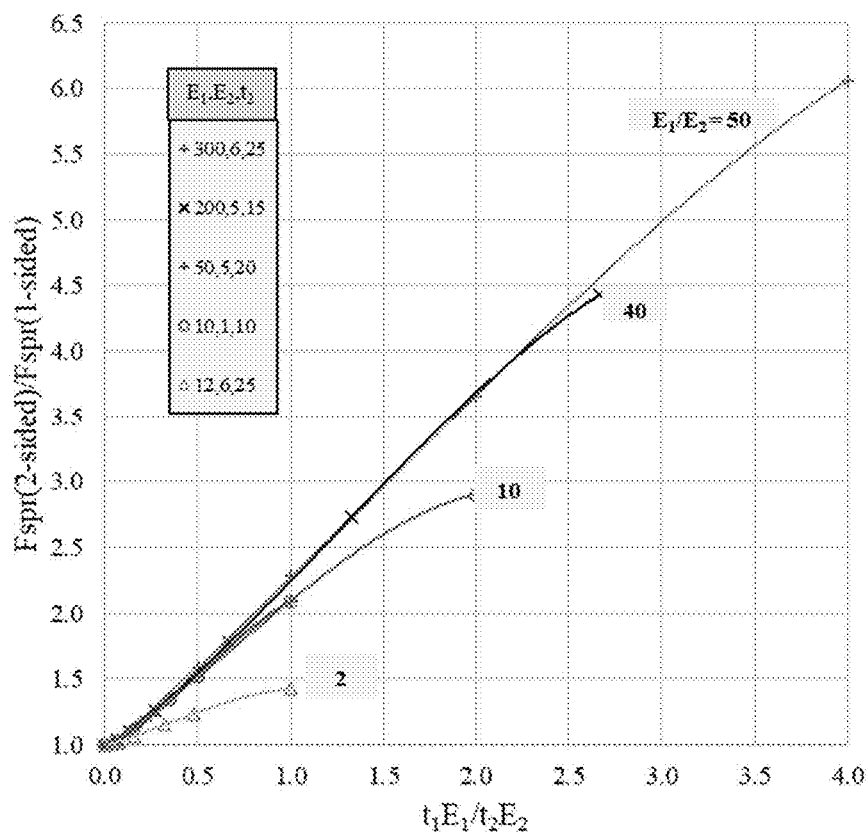
FIG. 17 is a graph showing the gain in spring force as a function of ratio of thickness-modulus products for layers 1-2.

FIG. 17 is a graph showing the gain in spring force as a function of ratio of thickness-modulus products for layers 1-2. In addition to the rate, FIG. 17 shows that the realizable magnitude of the spring force gain also depends on the high to low modulus ratio (E1/E2). For example, with E1/E3 at 10 or greater, gain in spring force more than double are possible.

FIG. 18 is a table showing data extracted from the FIG. 16 and FIG. 17 graphs. As will be appreciated from FIG. 18, as well as the graphs in FIGS. 16-17, a spring force gain of 25% is possible at a t1E1/t2E2 threshold of about 0.2, a spring force gain of 50% is possible at a t1E1/t2E2 threshold of about 0.4, and a spring force gain of 100% is possible at a t1E1/t2E2 threshold of about 0.8. From this data, in general, E1/E2 should be at least 10 in the symmetric case in certain example embodiments. In the asymmetric case, the lower of E1 and E3 divided by E2 should be at least 10 in certain example embodiments. In a similar vein, from this data, the lower of a product of the second modulus and the second thickness and a product of the third modulus and the third thickness, divided by (b) a product of the first modulus and the first thickness, should be at least 0.2 in certain example embodiments.

Although certain example embodiments have been described as including conductive layers of Mo on opposing sides of PEN, other arrangements may be used in different example embodiments. The other arrangements may include other conductive coatings and/or other polymer-based layers. For instance, Al, ITO, or the like, may be used as a conductive layer on a PEN, PET, PI, PEEK, or other layer, in different example embodiments.

Furthermore, although certain example embodiments describe the same material being used for the high modulus layer on each side of the resilient layer, different example embodiments may use different materials with respect to the high modulus layers. For instance, Mo and Al, Mo and ITO, Al and ITO, and/or other materials may be used on opposing sides of a polymer-based layer. When the same material types are used for the high modulus layers on opposing sides of the low modulus layers, they may be at least substantially symmetrical in terms of thickness. For example, when the same material types are used for the high modulus layers on opposing sides of the low modulus layers, the thicknesses of the high modulus layers may vary by no more than 25%, more preferably no more than 15%, and still more preferably by no more than 10%. In some instances, the thicknesses may vary by no more than 5% when the same material types are used for the high modulus layers on opposing sides of the low modulus layers. In situations where different materials are used, they may be at least substantially symmetrical in terms of their modulus times thickness values. For instance, when different material types are used for the high modulus layers on opposing sides of the low modulus layers, the product of their modulus and thickness preferably varies by no more than 25%, more preferably no more than 15%, and still more preferably by no more than 10%. In some instances, the products of the respective modulus and thickness values may vary by no more than 5% when different material types are used for the high modulus layers on opposing sides of the low modulus layers.

Certain example embodiments have been described as involving three-layer shutter systems, e.g., where high modulus layers sandwich a low modulus layer. However, different example embodiments may use different arrangements in which more or fewer layers are provided. The layer stacks may or may not be symmetrical about the low modulus substrate in different examples. For instance, in cases where an ink is involved, shifts in the stress regime may be taken into account, e.g., so that the products of the respective bulk modulus and thickness values for all of the layers on each side of the substrate are substantially the same.

Figure 19:
FIG. 19 is a cross-sectional view of an example shutter having improved spring force, in accordance with certain example embodiments.
Figure 20:
FIG. 20 is a cross-sectional view of another example shutter having improved spring force, in accordance with certain example embodiments.

FIGS. 19-20 are cross-sectional views of example shutters having improved spring force, in accordance with certain example embodiments. FIG. 19 uses the same material on each side of its resilient layer and includes only a single material thereon. As shown in FIG. 19, a PEN resilient layer 1902 is provided as a low modulus layer. First and second conductive coatings 1904a-1904b (which may include one or more layers comprising Al or Mo, for example) sandwich the PEN resilient layer 1902. To obtain the benefits discussed above, with a 23.4 micron thick PEN layer, 0.4 micron thick (or thicker) Al or 0.1 micron thick (or thicker) Mo may be used, in certain example embodiments. In certain example embodiments, these example thicknesses vary by no more than 25%, or no more than 15%, or no more than 10%.

In contrast with FIG. 19, FIG. 20 uses different layer stacks on each side of its resilient layer. That is, in FIG. 20, a PEN resilient layer 2002 is provided as a substrate. A conductive coating 2004 (which may include one or more layers comprising Al or Mo, for example) is provided on only one side of the PEN resilient layer 2002. First and second polyimide layers 2006a-2006b are provide as outermost layers in the FIG. 20 example shutter.

In the FIG. 20 example, the first and second polyimide layers 2006a-2006b each may be 2-4 micron thick wet-printed polyimide coatings. The PEN resilient layer 2002 may be 16-24 microns thick. One or both of the first and second polyimide layers 2006a-2006b may be doped for color. Thus, they may serve as (e.g., take the place of) an aesthetic ink layer. In addition, such layers have good dielectric properties, which is advantageous for the operation of the shade as a whole.

The spring force typically is highly dependent on the modulus of the metal layer, as will be appreciated from the description above. Shrinkage of the PEN caused by heating of the PEN also can be a driver of spring force. This is the case with the FIG. 20 example, for instance. It is noted, however, that spring force can be lost over time, e.g., as a result of long-term extension.

In the case of the FIG. 20 example design, the polyimide becomes far more dominant in terms of driving the overall spring force. The use of polyimide also seems to help overcome issues with the PEN relaxation caused by the high temperature processes, as the polyimide has a high Tg. That is, increasing Tg of the system reduces the modulus relaxation rate which, in turn, reduces spring force loss during long term extension. Certain example embodiments in general thus may seek to improve Tg of the system. In FIG. 20 in particular, the polyimide contributes to shade spring strength and high temperature resistance in terms of spring stability. The polyimide layers in essence become the outer flanges of the beam, providing stiffness. This arrangement may be used even though it does not satisfy the two threshold criteria set forth above (namely, the lower of E1 and E3 divided by E2 being at least 10; and the lower of a product of the second modulus and the second thickness and a product of the third modulus and the third thickness, divided by a product of the first modulus and the first thickness, being at least 0.2).

The IG units described herein may incorporate low-E coatings on any one or more of surfaces 1, 2, 3, and 4. As noted above, for example, such low-E coatings may serve as the conductive layers for shades. In other example embodiments, in addition to or apart from serving and conductive layers for shades, a low-E coating may be provided on another interior surface. For instance, a low-E coating may be provided on surface 2, and a shade may be provided with respect to surface 3. In another example, the location of the shade and the low-E coating may be reversed. In either case, a separate low-E coating may or may not be used to help operate the shade provided with respect to surface three. In certain example embodiments, the low-E coatings provided on surfaces 2 and 3 may be silver-based low-E coatings. Example low-E coatings are set forth in U.S. Pat. Nos. 9,802,860; 8,557,391; 7,998,320; 7,771,830; 7,198,851; 7,189,458; 7,056,588; and 6,887,575; the entire contents of each of which is hereby incorporated by reference. Low-E coatings based on ITO and/or the like may be used for interior surfaces and/or exterior surfaces. See, for example, U.S. Pat. Nos. 9,695,085 and 9,670,092; the entire contents of each of which is hereby incorporated by reference. These low-E coatings may be used in connection with certain example embodiments.

Antireflective coatings may be provided on major surfaces of the IG unit, as well. In certain example embodiments, an AR coating may be provided on each major surface on which a low-E coating and shade is not provided. Example AR coatings are described in, for example, U.S. Pat. Nos. 9,796,619 and 8,668,990 as well as U.S. Publication No. 2014/0272314; the entire contents of each of which is hereby incorporated by reference. See also U.S. Pat. No. 9,556,066, the entire contents of which is hereby incorporated by reference herein. These AR coatings may be used in connection with certain example embodiments.

The example embodiments described herein may be incorporated into a wide variety of applications including, for example, interior and exterior windows for commercial and/or residential application, skylights, doors, merchandizers such as refrigerators/freezers (e.g., for the doors and/or "walls" thereof), vehicle applications, etc.

Although certain example embodiments have been described in connection with IG units including two substrates, it will be appreciated that the techniques described herein may be applied with respect to so-called triple-IG units. In such units, first, second, and third substantially parallel spaced apart substrates are separated by first and second spacer systems, and shades may be provided adjacent to any one or more of the interior surfaces of the innermost and outermost substrates, and/or to one or both of the surfaces of the middle substrate.

Although certain example embodiments have been described as incorporating glass substrates (e.g., for use of the inner and outer panes of the IG units described herein), it will be appreciated that other example embodiments may incorporate a non-glass substrate for one or both of such panes. Plastics, composite materials, and/or the like may be used, for example. When glass substrates are used, such substrates may be heat treated (e.g., heat strengthened and/or thermally tempered), chemically tempered, left in the annealed state, etc. In certain example embodiments, the inner or outer substrate may be laminated to another substrate of the same or different material.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, an insulating glass (IG) unit is provided. First and second substrates each have interior and exterior major surfaces, the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates. The shade includes: a first conductive layer provided, directly or indirectly, on the interior major surface of the first substrate; a first dielectric layer provided, directly or indirectly, on the first conductive layer on a side thereof opposite the first substrate; and a shutter including a flexible substrate having a first modulus of elasticity. The flexible substrate includes first and second sides and having a first thickness. The first side of the flexible substrate supports a first layer stack comprising one or more layers and includes at least a second conductive layer. The first layer stack has a second thickness and a second modulus of elasticity. The second side of the flexible substrate supports a second layer stack comprising one or more layers. The second layer stack collectively has a third thickness and a third modulus of elasticity. The second modulus and the third modulus each are greater than the first modulus. The shutter is extendible from a shutter open position to a shutter closed position and is retractable from the shutter closed position to the shutter open position. A control circuit is configured to provide a voltage to create electrostatic forces that drive the flexible substrate to the shutter closed position. The ratio of the lower of the second and third modulus and the first modulus is at least 10, and (a) the lower of a product of the second modulus and the second thickness and a product of the third modulus and the third thickness, divided by (b) a product of the first modulus and the first thickness, is at least 0.2.

In addition to the features of the previous paragraph, in certain example embodiments, the second conductive layer may comprise Mo and/or Al.

In addition to either of the two previous paragraphs, in certain example embodiments, the first layer stack and the second layer stack each may include a metal layer, e.g., with the metal layer in the first layer stack being the second conductive layer.

In addition to the features of the previous paragraph, in certain example embodiments, the metal layers in the first and second layer stacks may be the only layers therein.

In addition to either of the two previous paragraphs, in certain example embodiments, the shutter may have a spring force that is at least 25% higher than an arrangement having the first thickness doubled and lacking the metal layer in the second layer stack.

In addition to any of the five previous paragraphs, in certain example embodiments, the flexible substrate may comprise PEN.

In addition to any of the six previous paragraphs, in certain example embodiments, a neutral axis along which there are no longitudinal stresses or strains is provided in a central area of the flexible substrate's cross-section.

In addition to the features of the previous paragraph, in certain example embodiments, the neutral axis may be spaced no more than 20% from the center of the shutter's cross-section.

In certain example embodiments, a method of making an IG unit and/or shade (with or without the substrate) in accordance with any of the eight previous paragraphs is provided. Similarly, in certain example embodiments, a method of operating a shade in accordance with any of the eight previous paragraphs is provided. In certain example embodiments, a substrate is provided. The substrate includes a dynamically controllable shade provided on the substrate. The shade includes a first conductive layer provided, directly or indirectly, on the substrate; a first dielectric layer provided, directly or indirectly, on the first conductive layer on a side thereof opposite the substrate; and a shutter including a flexible substrate having a first modulus of elasticity. The flexible substrate includes first and second sides and having a first thickness, the first side of the flexible substrate supporting a first layer stack comprising one or more layers and including at least a second conductive layer, the first layer stack having a second thickness and a second modulus of elasticity, the second side of the flexible substrate supporting a second layer stack comprising one or more layers, the second layer stack collectively having a third thickness and a third modulus of elasticity, the second modulus and the third modulus each being greater than the first modulus. The shutter is extendible from a shutter open position to a shutter closed position and is retractable from the shutter closed position to the shutter open position. The ratio of the lower of the second and third modulus and the first modulus is at least 10, and (a) the lower of a product of the second modulus and the second thickness and a product of the third modulus and the third thickness, divided by (b) a product of the first modulus and the first thickness, is at least 0.2. The substrate may include features of any of the eight previous paragraphs, for example.

In certain example embodiments, a method of making an insulating glass (IG) unit is provided. The method comprises having first and second substrates, each having interior and exterior major surfaces, the interior major surface of the first substrate facing the interior major surface of the second substrate. A dynamically controllable shade is provided on the first and/or second substrate. The shade includes: a first conductive layer provided, directly or indirectly, on the interior major surface of the first substrate; a first dielectric layer provided, directly or indirectly, on the first conductive layer on a side thereof opposite the first substrate; and a shutter including a flexible substrate having a first modulus of elasticity. The flexible substrate includes first and second sides and having a first thickness, the first side of the flexible substrate supporting a first layer stack comprising one or more layers and including at least a second conductive layer, the first layer stack having a second thickness and a second modulus of elasticity, the second side of the flexible substrate supporting a second layer stack comprising one or more layers, the second layer stack collectively having a third thickness and a third modulus of elasticity, the second modulus and the third modulus each being greater than the first modulus. The shutter is extendible from a shutter open position to a shutter closed position and is retractable from the shutter closed position to the shutter open position. The first and second conductive layers are connected to provide a voltage to create electrostatic forces that drive the flexible substrate to the shutter closed position. The first and second substrates are connected to one another in substantially parallel, spaced apart relation, such that a gap is defined therebetween and such that the dynamically controllable shade is located in the gap. The ratio of the lower of the second and third modulus and the first modulus is at least 10, and (a) the lower of a product of the second modulus and the second thickness and a product of the third modulus and the third thickness, divided by (b) a product of the first modulus and the first thickness, is at least 0.2.

In addition to the features of the previous paragraph, in certain example embodiments, the second conductive layer may comprise Mo and/or Al.

In addition to either of the two previous paragraphs, in certain example embodiments, the first layer stack and the second layer stack each may include a metal layer, e.g., with the metal layer in the first layer stack being the second conductive layer.

In addition to any of the three previous paragraphs, in certain example embodiments, a neutral axis along which there are no longitudinal stresses or strains may be provided in a central area of the flexible substrate's cross-section.

In addition to any of the four previous paragraphs, in certain example embodiments, the flexible substrate may comprise PEN.

In certain example embodiments, a method of operating a dynamic shade in an insulating glass (IG) unit is provided. The method comprises having the IG unit described herein; providing the voltage to the control circuit to drive the flexible substrate to the shutter closed position; and causing the flexible substrate to return to the shutter open position.

In certain example embodiments, an insulating glass (IG) unit is provided. First and second substrates each have interior and exterior major surfaces, the interior major surface of the first substrate facing the interior major surface of the second substrate. A spacer system helps to maintain the first and second substrates in substantially parallel spaced apart relation to one another and to define a gap therebetween. A dynamically controllable shade is interposed between the first and second substrates. The shade includes: a first conductive layer provided, directly or indirectly, on the interior major surface of the first substrate; a first dielectric layer provided, directly or indirectly, on the first conductive layer on a side thereof opposite the first substrate; and a shutter including a flexible substrate. The flexible substrate includes first and second sides, the first side of the flexible substrate supporting a first polyimide layer and a second conductive layer sandwiched between the flexible substrate and the first polyimide layer, the second side of the flexible substrate supporting a second polyimide layer. The shutter is extendible from a shutter open position to a shutter closed position and is retractable from the shutter closed position to the shutter open position. A control circuit is configured to provide a voltage to create electrostatic forces that drive the flexible substrate to the shutter closed position.

In addition to the features of the previous paragraph, in certain example embodiments, the second conductive layer may comprise Mo and/or Al.

In addition to either of the two previous paragraphs, in certain example embodiments, the flexible substrate may comprise PEN.

In addition to any of the three previous paragraphs, in certain example embodiments, each of the first and second polyimide layers may be doped for a desired coloration.

In addition to any of the four previous paragraphs, in certain example embodiments, each of the first and second polyimide layers may be wet-applied on the flexible substrate.

In certain example embodiments, a method of making an IG unit and/or shade (with or without the substrate) in accordance with any of the five previous paragraphs is provided. Similarly, in certain example embodiments, a method of operating a shade in accordance with any of the five previous paragraphs is provided.

While the invention has been described in connection with what is presently considered to be the most practical and preferred embodiment, it is to be understood that the invention is not to be limited to the disclosed embodiment and/or deposition techniques, but on the contrary, is intended to cover various modifications and equivalent arrangements included within the spirit and scope of the appended claims.

What is claimed is:

1. An insulating glass (IG) unit, comprising:
   first and second substrates, each having interior and exterior major surfaces, the interior major surface of the first substrate facing the interior major surface of the second substrate;
   a spacer system helping to maintain the first and second substrates in substantially parallel spaced apart relation to one another and to define a gap therebetween;
   a dynamically controllable shade interposed between the first and second substrates, the shade including:
   a first conductive layer provided, directly or indirectly, on the interior major surface of the first substrate;
   a first dielectric layer provided, directly or indirectly, on the first conductive layer on a side thereof opposite the first substrate; and
   a shutter including a flexible substrate having a first modulus of elasticity, the flexible substrate including first and second sides and having a first thickness, the first side of the flexible substrate supporting a first layer stack comprising one or more layers and including at least a second conductive layer, the first layer stack having a second thickness and a second modulus of elasticity, the second side of the flexible substrate supporting a second layer stack comprising one or more layers, the second layer stack collectively having a third thickness and a third modulus of elasticity, the second modulus and the third modulus each being greater than the first modulus, the shutter being extendible from a shutter open position to a shutter closed position and being retractable from the shutter closed position to the shutter open position; and
   a control circuit configured to provide a voltage to create electrostatic forces that drive the flexible substrate to the shutter closed position,
   wherein the ratio of the lower of the second and third modulus and the first modulus is at least 10, and
   wherein (a) the lower of a product of the second modulus and the second thickness and a product of the third modulus and the third thickness, divided by (b) a product of the first modulus and the first thickness, is at least 0.2.

2. The IG unit of claim 1, wherein the second conductive layer comprises Mo and/or Al.

3. The IG unit of claim 1, wherein the first layer stack and the second layer stack each include a metal layer, the metal layer in the first layer stack being the second conductive layer.

4. The IG unit of claim 3, wherein the metal layers in the first and second layer stacks are the only layers therein.

5. The IG unit of claim 3, wherein the shutter has a spring force that is at least 25% higher than an arrangement having the first thickness doubled and lacking the metal layer in the second layer stack.

6. The IG unit of claim 1, wherein the flexible substrate comprises PEN.

7. The IG unit of claim 1, wherein a neutral axis along which there are no longitudinal stresses or strains is provided in a central area of the flexible substrate's cross-section.

8. The IG unit of claim 7, wherein the neutral axis is spaced no more than 20% from the center of the shutter's cross-section.

9. An insulating glass (IG) unit, comprising:
   first and second substrates, each having interior and exterior major surfaces, the interior major surface of the first substrate facing the interior major surface of the second substrate;
   a spacer system helping to maintain the first and second substrates in substantially parallel spaced apart relation to one another and to define a gap therebetween;
   a dynamically controllable shade interposed between the first and second substrates, the shade including:
   a first conductive layer provided, directly or indirectly, on the interior major surface of the first substrate;
   a first dielectric layer provided, directly or indirectly, on the first conductive layer on a side thereof opposite the first substrate; and
   a shutter including a flexible substrate, the flexible substrate including first and second sides, the first side of the flexible substrate supporting a first polyimide layer and a second conductive layer sandwiched between the flexible substrate and the first polyimide layer, the second side of the flexible substrate supporting a second polyimide layer, the shutter being extendible from a shutter open position to a shutter closed position and being retractable from the shutter closed position to the shutter open position; and
   a control circuit configured to provide a voltage to create electrostatic forces that drive the flexible substrate to the shutter closed position.

10. The IG unit of claim 9, wherein the second conductive layer comprises Mo and/or Al.

11. The IG unit of claim 9, wherein the flexible substrate comprises PEN.

12. The IG unit of claim 9, wherein each of the first and second polyimide layers are doped for a desired coloration.

13. The IG unit of claim 9, wherein each of the first and second polyimide layers are wet-applied on the flexible substrate.

14. A method of making the IG unit of claim 9, the method comprising:
   having the first and second substrates, and
   providing the dynamically controllable shade on the first and/or second substrate.

15. A method of operating a dynamic shade in an insulating glass (IG) unit, the method comprising:
   having the IG unit of claim 9;
   providing the voltage to the control circuit to drive the flexible substrate to the shutter closed position; and
   causing the flexible substrate to return to the shutter open position.

16. A substrate, comprising:
   a dynamically controllable shade provided on the substrate, the shade including:
   a first conductive layer provided, directly or indirectly, on the substrate;

a first dielectric layer provided, directly or indirectly, on the first conductive layer on a side thereof opposite the substrate; and a shutter including a flexible substrate having a first modulus of elasticity, the flexible substrate including first and second sides and having a first thickness, the first side of the flexible substrate supporting a first layer stack comprising one or more layers and including at least a second conductive layer, the first layer stack having a second thickness and a second modulus of elasticity, the second side of the flexible substrate supporting a second layer stack comprising one or more layers, the second layer stack collectively having a third thickness and a third modulus of elasticity, the second modulus and the third modulus each being greater than the first modulus, the shutter being extendible from a shutter open position to a shutter closed position and being retractable from the shutter closed position to the shutter open position, wherein the ratio of the lower of the second and third modulus and the first modulus is at least 10, and wherein (a) the lower of a product of the second modulus and the second thickness and a product of the third modulus and the third thickness, divided by (b) a product of the first modulus and the first thickness, is at least 0.2.

17. A method of making an insulating glass (IG) unit, the method comprising:

having first and second substrates, each having interior and exterior major surfaces, the interior major surface of the first substrate facing the interior major surface of the second substrate;

providing a dynamically controllable shade on the first and/or second substrate, the shade including:

a first conductive layer provided, directly or indirectly, on the interior major surface of the first substrate;

a first dielectric layer provided, directly or indirectly, on the first conductive layer on a side thereof opposite the first substrate; and a shutter including a flexible substrate having a first modulus of elasticity, the flexible substrate including first and second sides and having a first thickness, the first side of the flexible substrate supporting a first layer stack comprising one or more layers and including at least a second conductive layer, the first layer stack having a second thickness and a second modulus of elasticity, the second side of the flexible substrate supporting a second layer stack comprising one or more layers, the second layer stack collectively having a third thickness and a third modulus of elasticity, the second modulus and the third modulus each being greater than the first modulus, the shutter being extendible from a shutter open position to a shutter closed position and being retractable from the shutter closed position to the shutter open position;

connecting the first and second conductive layers to provide a voltage to create electrostatic forces that drive the flexible substrate to the shutter closed position; and connecting the first and second substrates to one another in substantially parallel, spaced apart relation, such that a gap is defined therebetween and such that the dynamically controllable shade is located in the gap, wherein the ratio of the lower of the second and third modulus and the first modulus is at least 10, and wherein (a) the lower of a product of the second modulus and the second thickness and a product of the third modulus and the third thickness, divided by (b) a product of the first modulus and the first thickness, is at least 0.2.

18. The method of claim 17, wherein the second conductive layer comprises Mo and/or Al.

19. The method of claim 17, wherein the first layer stack and the second layer stack each include a metal layer, the metal layer in the first layer stack being the second conductive layer.

20. The method of claim 17, wherein a neutral axis along which there are no longitudinal stresses or strains is provided in a central area of the flexible substrate's cross-section.

21. The method of claim 17, wherein the flexible substrate comprises PEN.

22. A method of operating a dynamic shade in an insulating glass (IG) unit, the method comprising:

having the IG unit of claim 1;

providing the voltage to the control circuit to drive the flexible substrate to the shutter closed position; and causing the flexible substrate to return to the shutter open position.

* * * * *